(12) United States Patent  
Kondo et al.

(10) Patent No.: US 8,311,323 B2  
(45) Date of Patent: Nov. 13, 2012

(54) IMAGE PROCESSOR FOR CONVERTING IMAGE BY USING IMAGE RETRIEVED BASED ON KEYWORD

(75) Inventors: Masaki Kondo, Toyoake (JP); Tomohiko Hasegawa, Nagoya (JP)

(73) Assignee: Brother Kogyo Kabushiki Kaisha, Aichi-ken (JP)

(*) Notice: Subject to any disclaimer, the term of this patent is extended or adjusted under 35 U.S.C. 154(b) by 1037 days.

(21) Appl. No.: 12/202,885

(22) Filed: Sep. 2, 2008

(65) Prior Publication Data

US 2009/0060364 A1 Mar. 5, 2009

(30) Foreign Application Priority Data

Aug. 31, 2007 (JP) ................................ 2007-226089

(51) Int. Cl.  
G06K 9/00 (2006.01)
(52) U.S. Cl. .......................................... 382/167; 382/162
(58) Field of Classification Search .................. None  
See application file for complete search history.

(56) References Cited

U.S. PATENT DOCUMENTS

| | | | |
|---|---|---|---|
| 5,023,708 A | 6/1991 | Maruyama et al. |
| 5,210,600 A | 5/1993 | Hirata |
| 5,459,589 A | 10/1995 | Ohnishi et al. |
| 5,539,426 A | 7/1996 | Nishikawa et al. |
| 5,680,230 A | 10/1997 | Kaburagi et al. |
| 5,734,802 A | 3/1998 | Maltz et al. |
| 5,764,380 A | 6/1998 | Noguchi |
| 5,805,308 A | 9/1998 | Tanaka et al. |
| 5,940,530 A | 8/1999 | Fukushima et al. |
| 6,072,914 A | 6/2000 | Mikuni |
| 6,333,752 B1 | 12/2001 | Hasegawa et al. |
| 6,646,760 B1 | 11/2003 | Hanihara |
| 6,757,427 B1 | 6/2004 | Hongu |

(Continued)

FOREIGN PATENT DOCUMENTS

EP 1 648 158 A1 4/2006

(Continued)

OTHER PUBLICATIONS

Official Action dated May 31, 2011 received from the Japanese Patent Office from related Japanese Application No. JP 2007-226091 and U.S. Appl. No. 12/194,680, together with a partial English-language translation.

(Continued)

*Primary Examiner* — Li Liu  
(74) *Attorney, Agent, or Firm* — Scully, Scott, Murphy & Presser PC

(57) ABSTRACT

An image processor includes a keyword inputting unit, a first image acquiring unit, a first characteristic quantity determining unit, a second image inputting unit, a second characteristic quantity determining unit and an image correcting unit. The keyword inputting unit inputs a keyword. The first image acquiring unit acquires at least one first image related to the keyword inputted by the keyword inputting unit. The first characteristic quantity determining unit determines first characteristic quantity data expressing a characteristic of at least one of the at least one first image acquired by the first image acquiring unit. The second image inputting unit inputs a second image. The second characteristic quantity determining unit determines second characteristic quantity data expressing a characteristic of the second image inputted by the second image inputting unit. The image correcting unit performs an image correction process on the second image to adjust characteristic of the second image represented by the second characteristic quantity data close to the first characteristic quantity data.

8 Claims, 11 Drawing Sheets

U.S. PATENT DOCUMENTS

| | | | |
|---|---|---|---|
| 6,801,334 B1 | 10/2004 | Enomoto | |
| 6,922,261 B2 * | 7/2005 | Asano | 358/1.9 |
| 7,099,022 B1 | 8/2006 | Kawaoka | |
| 7,145,597 B1 | 12/2006 | Kinjo | |
| 7,215,792 B2 | 5/2007 | Sharma et al. | |
| 7,283,247 B2 | 10/2007 | Okawa et al. | |
| 7,308,155 B2 | 12/2007 | Terada | |
| 7,349,119 B2 | 3/2008 | Tsukioka | |
| 7,508,550 B2 | 3/2009 | Kameyama | |
| 7,729,013 B2 | 6/2010 | Nishida | |
| 7,903,307 B2 | 3/2011 | Dai et al. | |
| 2002/0060796 A1 | 5/2002 | Kanno et al. | |
| 2003/0031375 A1 | 2/2003 | Enomoto | |
| 2003/0091229 A1 * | 5/2003 | Edge et al. | 382/162 |
| 2003/0128379 A1 | 7/2003 | Inoue | |
| 2003/0193582 A1 * | 10/2003 | Kinjo | 348/231.99 |
| 2004/0036892 A1 | 2/2004 | Ito et al. | |
| 2004/0212808 A1 | 10/2004 | Okawa et al. | |
| 2005/0152613 A1 | 7/2005 | Okutsu | |
| 2005/0220347 A1 * | 10/2005 | Enomoto et al. | 382/190 |
| 2006/0001928 A1 | 1/2006 | Hayaishi | |
| 2006/0074861 A1 * | 4/2006 | Wilensky | 707/3 |
| 2006/0109529 A1 | 5/2006 | Shimazawa | |
| 2006/0140477 A1 * | 6/2006 | Kurumisawa et al. | 382/169 |
| 2006/0187477 A1 | 8/2006 | Maki et al. | |
| 2006/0238827 A1 | 10/2006 | Ikeda | |
| 2006/0256410 A1 | 11/2006 | Koie et al. | |
| 2006/0257041 A1 * | 11/2006 | Kameyama et al. | 382/254 |
| 2006/0291017 A1 | 12/2006 | Moran et al. | |
| 2007/0019260 A1 | 1/2007 | Tokie | |
| 2007/0070436 A1 | 3/2007 | Iwaki | |
| 2007/0080973 A1 * | 4/2007 | Stauder et al. | 345/589 |
| 2007/0177029 A1 | 8/2007 | Wada et al. | |
| 2007/0206206 A1 | 9/2007 | Kondo et al. | |
| 2007/0292038 A1 | 12/2007 | Takemoto | |
| 2008/0002216 A1 | 1/2008 | Matsushima | |
| 2008/0239410 A1 | 10/2008 | Hashii et al. | |
| 2009/0128871 A1 * | 5/2009 | Patton et al. | 358/520 |
| 2009/0244564 A1 | 10/2009 | Kondo et al. | |
| 2010/0033745 A1 | 2/2010 | Dai et al. | |

FOREIGN PATENT DOCUMENTS

| | | |
|---|---|---|
| JP | H05-119752 | 5/1993 |
| JP | H05-300531 | 11/1993 |
| JP | 5-342344 A | 12/1993 |
| JP | 6-133329 | 5/1994 |
| JP | 7-177366 A | 7/1995 |
| JP | 7-312720 A | 11/1995 |
| JP | H09-116740 | 5/1997 |
| JP | H09-172553 | 6/1997 |
| JP | H09-284583 | 10/1997 |
| JP | 9-325536 | 12/1997 |
| JP | 10-173947 | 6/1998 |
| JP | H10-149441 | 6/1998 |
| JP | H11-098374 | 4/1999 |
| JP | H11-185034 | 7/1999 |
| JP | H11-196258 | 7/1999 |
| JP | 2000-106623 | 4/2000 |
| JP | 2000-152268 | 5/2000 |
| JP | 2000-196904 A | 7/2000 |
| JP | 2001-051062 | 2/2001 |
| JP | 2001-061062 | 3/2001 |
| JP | 2001-136313 | 5/2001 |
| JP | 2001-160908 | 6/2001 |
| JP | 2002-171408 | 6/2002 |
| JP | 2003-108987 | 4/2003 |
| JP | 2003-187215 | 7/2003 |
| JP | 2003-296723 | 10/2003 |
| JP | 2004-007370 | 1/2004 |
| JP | 2004-054751 | 2/2004 |
| JP | 2004-343365 | 12/2004 |
| JP | 2004-350212 | 12/2004 |
| JP | 2005-182143 A | 7/2005 |
| JP | 2005-192158 | 7/2005 |
| JP | 2005-197996 | 7/2005 |
| JP | 2005-202469 | 7/2005 |
| JP | 2005-242535 | 9/2005 |
| JP | 2005-309651 | 11/2005 |
| JP | 2006-80746 | 3/2006 |
| JP | 2006-121695 | 5/2006 |
| JP | 2006-229537 | 8/2006 |
| JP | 2006-229811 A | 8/2006 |
| JP | 2006-303899 | 11/2006 |
| JP | 2007-89179 | 4/2007 |
| JP | 2007-208413 | 8/2007 |
| WO | WO 2006/036027 A1 | 4/2006 |

OTHER PUBLICATIONS

Japanese Official Action dated Jun. 7, 2011 together with an English language translation from JP 2007-226584 received in related U.S. Appl. No. 12/202,872, filed Sep. 2, 2008.

Japanese Official Action dated Jun. 7, 2011 together with an English language translation from JP 2007-226586 received in related U.S. Appl. No. 12/202,872, filed Sep. 2, 2008.

United States Office Action dated Jul. 25, 2011 received in related U.S. Appl. No. 12/194,680.

Japanese Official Action dated Aug. 25, 2009 with English translation.

Japanese Official Action dated Sep. 8, 2009 with English translation.

Web-page from the SITEMAKER website, together with English translation, May 11, 2007, http://www.n1-sitemaker.com/cgi-bin/nextone/sitemaker.cgi?mode=page=page2&category=4.

Web-page from a personal website, namely 'kappa teki denou kukkan', together with English translation, Apr. 12, 2001, http://kapp.cool.ne.jp/howto/cg/comic6.htm.

Manual for EPSON COLORIO PM-D770, together with English translation, Oct. 7, 2004.

Manual for CANOSCAN 8400F, together with English translation, Jul. 18, 2004.

Web-page from Hiroshima Prefecture Website, together with English translation, Mar. 31, 2005, http://www.work2.pref.hiroshima.jp/soho/a/a08/a08061.html.

Japanese Office Action issued in Patent Application No. JP 2007-226090 on Apr. 12, 2011 together with English language translation from related U.S. Appl. No. 12/202,986.

U.S. Official Action dated Apr. 14, 2011 from related U.S. Appl. No. 12/202,971.

U.S. Official Action dated Apr. 18, 2011 from related U.S. Appl. No. 12/202,872.

U.S. Official Action dated Apr. 19, 2011 from related U.S. Appl. No. 12/200,472.

U.S. Official Action dated May 18, 2011 from related U.S. Appl. No. 12/202,986.

Office Action dated Aug. 9, 2011 received from the Japanese Patent Office from related Japanese Application No. 2007-226088 and U.S. Appl. No. 12/202,872, together with an English-language translation.

United States Office Action dated Oct. 25, 2011 received in related U.S. Appl. No. 12/202,986.

United States Notice of Allowance dated Dec. 30, 2011 received in related U.S. Appl. No. 12/194,680.

U.S. Final Official Action dated Sep. 29, 2011 from related U.S. Appl. No. 12/200,472.

U.S. Final Official Action dated Oct. 14, 2011 from related U.S. Appl. No. 12/202,872.

United States Office Action dated Jul. 9, 2012 received in related U.S. Appl. No. 12/200,472.

Notice of Allowance dated Jul. 2, 2012 received in related U.S. Appl. No. 12/202,986.

U.S. Office Action dated Mar. 15, 2012 received in related case, namely, U.S. Appl. No. 12/202,986.

* cited by examiner

FIG.5
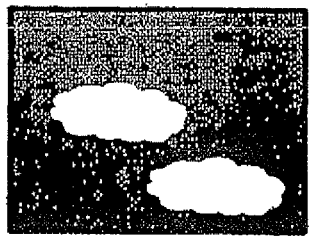
IMAGE 1
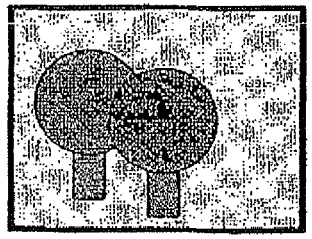
IMAGE 2
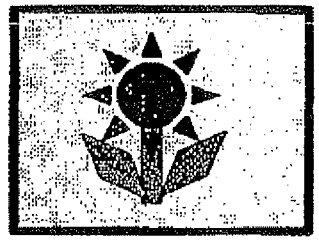
IMAGE 3
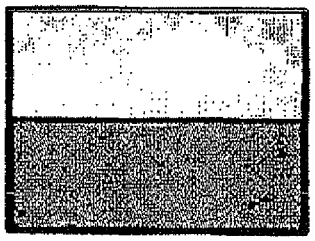
IMAGE 4
IMAGE 5
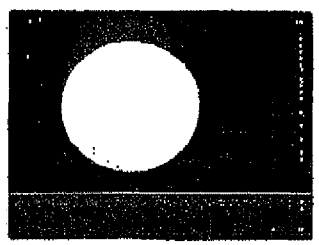
IMAGE 6
FIG.6
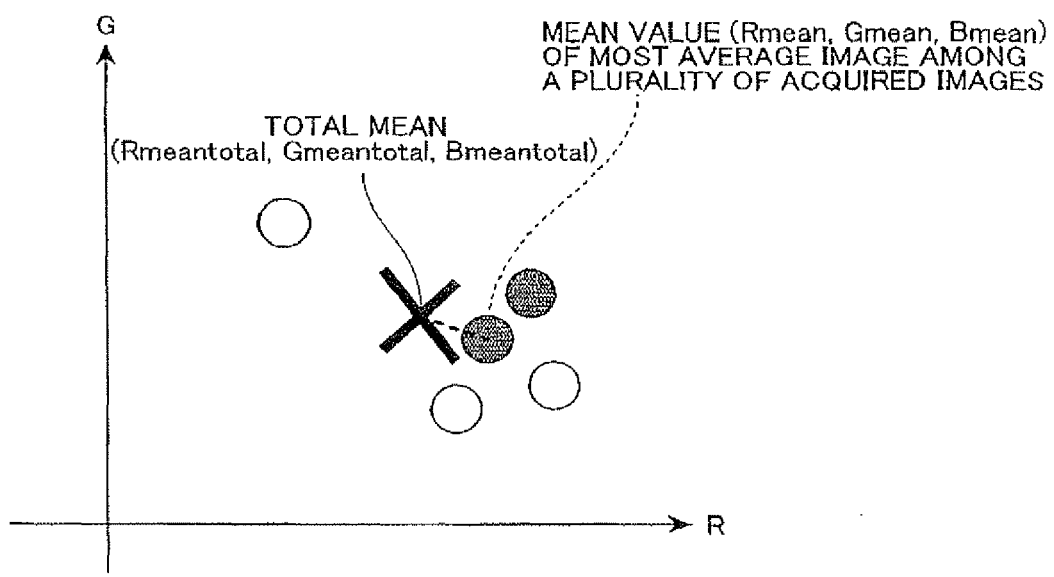

COLOR HUE-REGION 1    COLOR HUE-REGION 2

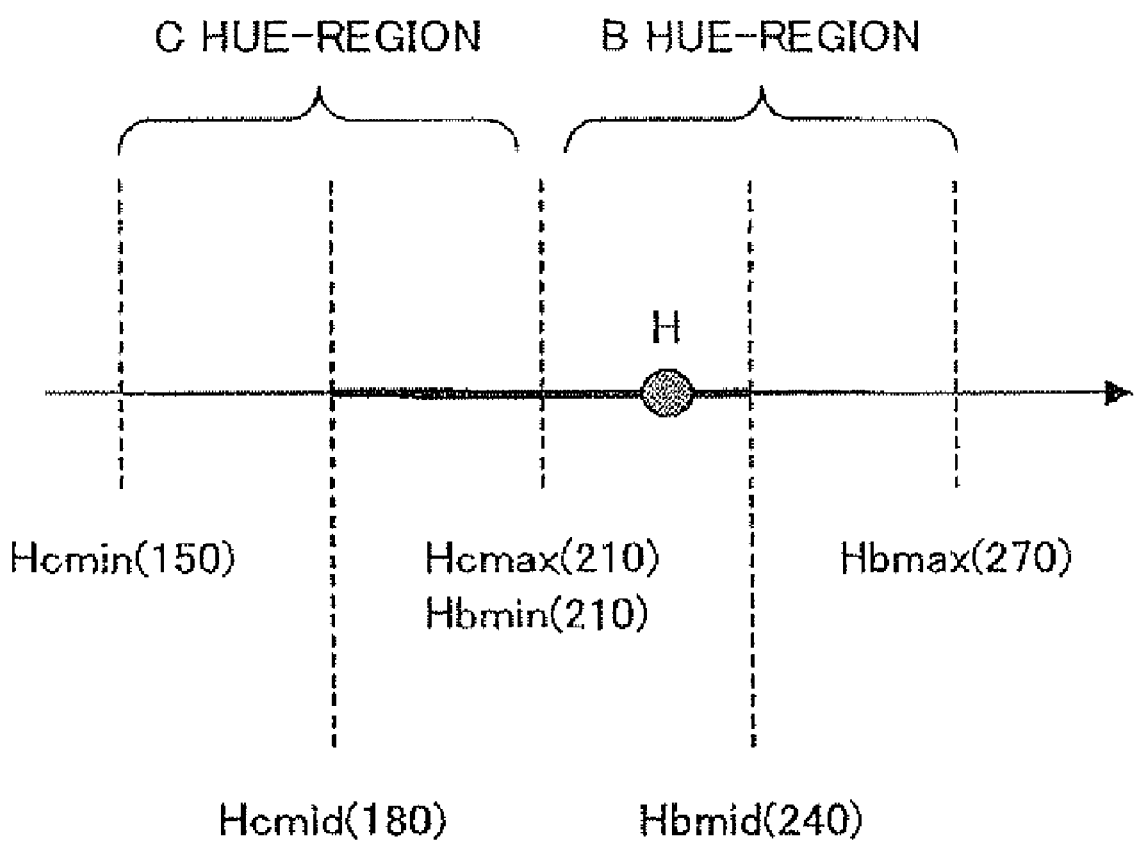

US 8,311,323 B2

IMAGE PROCESSOR FOR CONVERTING IMAGE BY USING IMAGE RETRIEVED BASED ON KEYWORD

CROSS REFERENCE TO RELATED APPLICATION

This application claims priority from Japanese Patent Application No. 2007-226089 filed Aug. 31, 2007. The entire content of this priority application is incorporated herein by reference.

TECHNICAL FIELD

The present invention relates to an image processor for implementing an image correction process.

BACKGROUND

Image processors that correct images based on user preferences are well known in the art. One such image processor disclosed in Japanese unexamined patent application publication No. 2007-89179 performs image calibration based on calibration data set arbitrarily by the user or selected from among a plurality of calibration data prepared in advance.

SUMMARY

However, because calibration data must be set in order to perform a desired image correction, the user must have technical knowledge of the image; in other words, the user cannot easily make intuitive settings.

In view of the foregoing, it is an object of the present invention to provide an image processor that enables a user to make settings for image correction intuitively.

In order to attain the above and other objects, the invention provides an image processor including: a keyword inputting unit; a first image acquiring unit; a first characteristic quantity determining unit; a second image inputting unit; a second characteristic quantity determining unit; and an image correcting unit. The keyword inputting unit inputs a keyword. The first image acquiring unit acquires at least one first image related to the keyword inputted by the keyword inputting unit. The first characteristic quantity determining unit determines first characteristic quantity data expressing a characteristic of at least one of the at least one first image acquired by the first image acquiring unit. The second image inputting unit inputs a second image. The second characteristic quantity determining unit determines second characteristic quantity data expressing a characteristic of the second image inputted by the second image inputting unit. The image correcting unit performs an image correction process on the second image to adjust characteristic of the second image represented by the second characteristic quantity data close to the first characteristic quantity data.

According to another aspect, the invention provides an image processing method including: inputting a keyword; acquiring at least one first image related to the inputted keyword; determining first characteristic quantity data expressing a characteristic of at least one of the acquired at least one first image; inputting a second image; determining second characteristic quantity data expressing a characteristic of the inputted second image; and performing an image correction process on the second image to adjust characteristic of the second image represented by the second characteristic quantity data close to the first characteristic quantity data.

According to another aspect, the invention provides a computer readable storage medium storing a set of image processing program instructions executable on an image processor, instructions including: inputting a keyword; acquiring at least one first image related to the inputted keyword; determining first characteristic quantity data expressing a characteristic of at least one of the acquired at least one first image; inputting a second image; determining second characteristic quantity data expressing a characteristic of the inputted second image; and performing an image correction process on the second image to adjust characteristic of the second image represented by the second characteristic quantity data close to the first characteristic quantity data.

BRIEF DESCRIPTION OF THE DRAWINGS

The particular features and advantages of the invention as well as other objects will become apparent from the following description taken in connection with the accompanying drawings, in which:

FIG. 5 is an example illustrating sample pictures relating to a keyword;

FIG. 6 is a graph illustrating a position of relationship between an average value of each image and a total average value in the RGB space;

FIG. 17 is an explanatory diagram showing parts of the B hue-region and C hue-region targeted for conversion.

DETAILED DESCRIPTION

Figure 1:
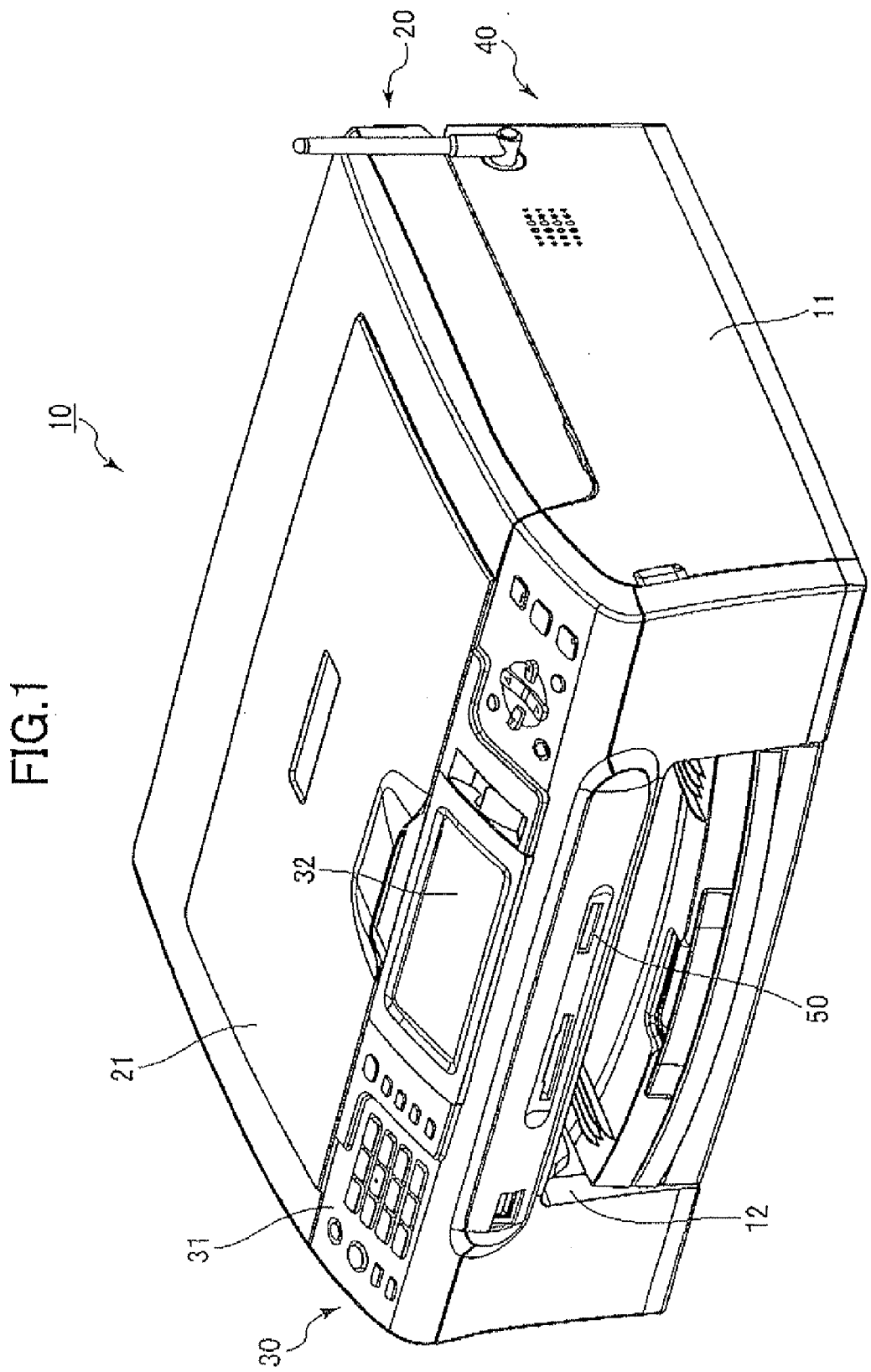
FIG. 1 is a perspective view showing the external appearance of a multifunction device according to a first embodiment of the present invention.

Next, embodiments of the present invention will be described while referring to the accompanying drawings. First, a first embodiment of the present invention will be described with reference to FIGS. 1-11. FIG. 1 is a perspective view showing the outer appearance of a multifunction device 10 serving as the image processor of the first embodiment.

The multifunction device 10 is provided with various functions, including a printer function, scanner function, and color copier function. The multifunction device 10 is configured of a main casing 11, an image-reading unit 20 provided in the upper section of the main casing 11 for scanning original documents, a control panel 30 provided on the front of the image-reading unit 20, and an image-printing unit 40 disposed in the bottom section of the main casing 11 for printing color images on a printing medium.

The image-reading unit 20 is a flatbed scanner that optically reads images from an original document placed on a document-supporting surface configured of a glass bed. A thin plate-shaped document cover 21 covers the top of the document-supporting surface. By opening the document cover 21 upward, the user can place an original document on the document-supporting surface or remove an original document therefrom. The surface of the document cover 21 opposing an original document positioned on the document-supporting surface is white in color. Therefore, when scanning an image with the document cover 21 closed (the state shown in FIG. 1), areas around the original document on the document-supporting surface are scanned as white.

The control panel 30 provided on the front (near side) of the image-reading unit 20 is configured of an operating section 31 including various operating buttons, and a display section 32 (liquid crystal display, for example) for displaying messages, images, and other data.

The image-printing unit 40 provided below the image-reading unit 20 is capable of printing color images on paper or another printing medium. After an image is printed on the paper, the image-printing unit 40 discharges the paper through an opening 12 formed in the front surface of the main casing 11.

The multifunction device 10 also includes a card slot section 50 on the front surface of the main casing 11 above the opening 12. The card slot section 50 accepts the insertion of various memory cards (portable storage media), such as an SD Card or CompactFlash card. The multifunction device 10 also has a direct print function for directly reading from a memory card images taken by a digital still camera or the like, rather than reading images from a personal computer or other data processor, and for printing these images.

Figure 2:
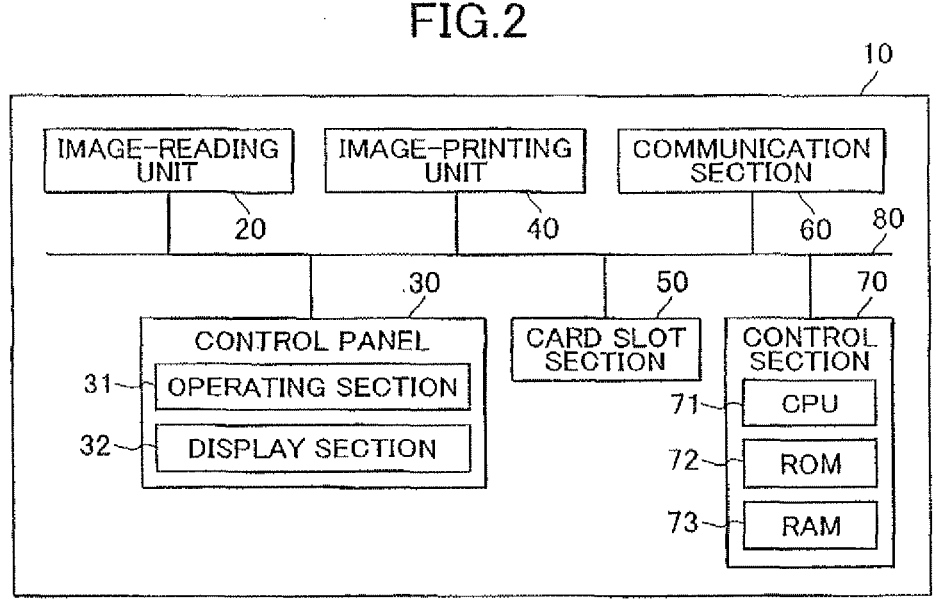
FIG. 2 is a block diagram illustrating the general structure of a control system in the multifunction device.
Figure 3:
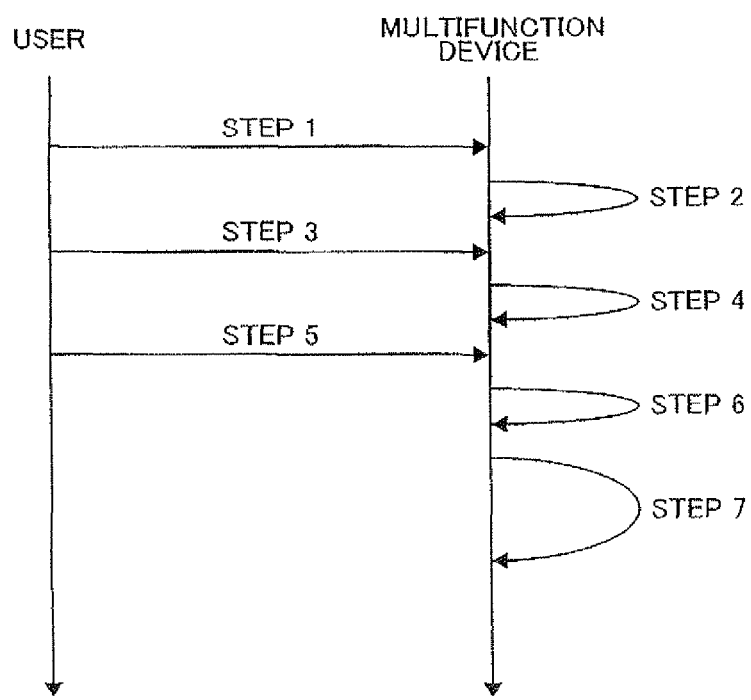
FIG. 3 is an explanatory diagram showing an overview of conceivable user operations and resulting processing on the multifunction device in a color conversion process.

Next, the control system of the multifunction device 10 will be described. FIG. 2 is a block diagram showing the overall structure of this control system. As shown in FIG. 2, the multifunction device 10 includes the image-reading unit 20, control panel 30, image-printing unit 40, and card slot section 50 described above, as well as a communication section 60 and a control section 70 connected to one another via a signal line 80.

When connected to a communication cable, such as a LAN cable, the communication section 60 transmits and receives data via the communication cable. Hence, the communication section 60 functions to perform data communications with an external device such as a personal computer connected to the LAN or a Web server on the Internet. Web is short for WWW (World Wide Web) and a document system used normally when using Internet and Intranet.

The control section 70 is primarily configured of a microcomputer having a CPU 71, a RON 72, and a RAM 73, and performs overall control of the components constituting the multifunction device 10. The ROM 72 stores programs executed by the CPU 71 to implement a color conversion process described later.

Next, an overview of the color conversion process performed on the multifunction device 10 will be described. The multifunction device 10 performs color conversion on a user's selected image based on an image serving as a model for color conversion (hereinafter referred to as a "sample image"). First, a conceivable color conversion process will be described with reference to FIG. 3.

In this conceivable process, the user places an original document on which a sample image is printed, such as a photograph, on the document-supporting surface of the image-reading unit 20 and operates the operating section 31 to input his/her instruction to scan the document (step 1). At this time, the multifunction device 10 reads the sample image within a specified region of the document-supporting surface (a user-specified size, such as L-size (photo paper), A4 size, or the like) (step 2). Through these processes, a sample image is read from the original document resting on the document-supporting surface.

Next, the user inserts a memory card storing images as candidates for color conversion into the card slot section 50 (step 3). The multifunction device 10 recognizes the inserted memory card and prompts the user to select an image to be subjected to color conversion from among the images stored on the memory card (step 4). Here, any suitable process known in the art may be employed as the process for prompting the user to select an image, such as a process for displaying images stored in the memory card on the display section 32 and enabling the user to select an image through operations on the operating section 31.

Once the user has selected an image to be subjected to color conversion (step 5), the multifunction device 10 reads the selected image (step 6). In the following description, the selected image will be referred to as the "original image."

Subsequently, the multifunction device 10 performs a process to correct the original image read from the memory card using the sample image read from the image-reading unit 20 as a model (step 7). In this procedure, the original image is read from the memory card after reading the sample image from the image-reading unit 20. However, it is also possible to read the original image from the memory card first and subsequently read the sample image with the image-reading unit 20.

Through this color conversion process, the user can execute a color conversion process on an original image that is intuitively based on the sample image and requires only simple operations to perform. However, the user will possibly not have any sample images showing the result of his/her desired color conversion process.

According to the embodiment of the present invention, the multifunction device 10 performs color conversion process by prompting the user to specify a keyword.

1-3. A Specific Example of the Color Conversion Process

Next, a specific example of the color conversion process that the multifunction device 10 performs according to the present embodiments will be described.

1-3-1. Color Conversion Process

Figure 4:
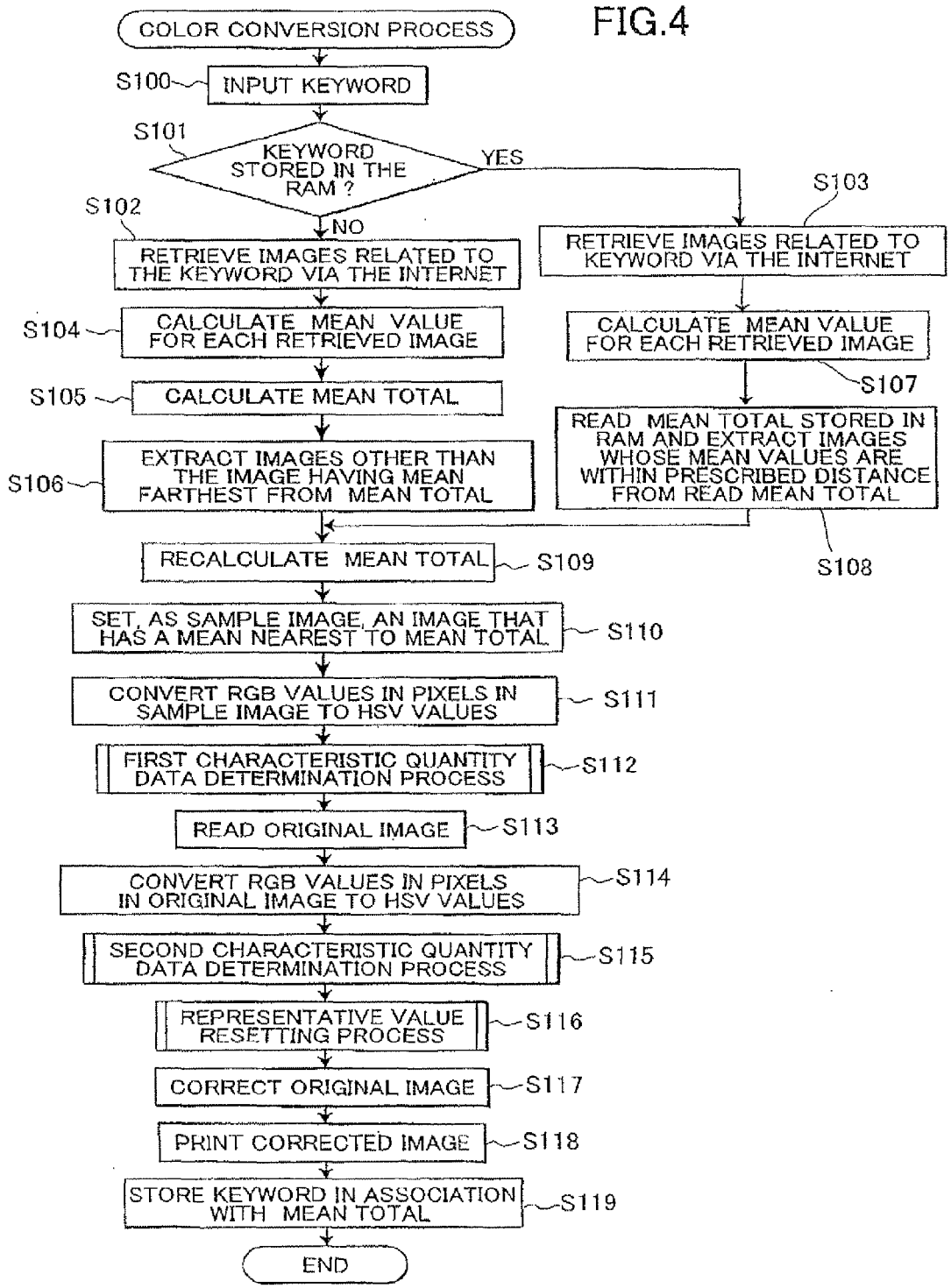
FIG. 4 is a flowchart illustrating steps in the color conversion process.

FIG. 4 is a flowchart illustrating steps in the color conversion process executed by the CPU 71 of the multifunction device 10. In S100 at the beginning of this color conversion process, the CPU 71 receives a user-inputted keyword for identifying a sample image. Specifically, the CPU 71 displays a message on the display section 32 prompting the user to specify a keyword, for example, and the user specifies the keyword through operations on the operating section 31.

In S101 the CPU 71 determines whether the keyword inputted in S100 is the same as one of keywords that are stored in the RAN 73. As will be described later for S119, each of previously inputted keywords is stored in the RAM 73 in association with a set of mean total RGB values ($R_{meantotal}$, $G_{meantotal}$, $B_{meantotal}$) calculated from a plurality of sets of mean RGB values ($R_{mean}$, $G_{mean}$, $B_{mean}$) for a plurality of images that have been acquired based on the keyword. Hence, in S101 the CPU 71 determines whether the keyword inputted in S100 has been inputted previously.

If the CPU 71 determines in S101 that the keyword inputted in S100 is not stored in the RAM 73 (a new keyword) (no in S101), then in S102 the CPU 71 retrieves images related to the keyword via the Internet. Specifically, the CPU 71 acquires images from a Web server stored in relation to the keyword. Here, it is preferable to set an upper limit to the number of images acquired because it is conceivable that an enormous number of images may be related to certain keywords.

For example, if an upper limit of six is set as the number of images to acquire, images 1-6 shown in FIG. 5 are acquired when the user inputs the keyword "May sunshine." In the embodiment, the format of the acquired images is the RGB format, but the present invention is not particularly limited to this format. Further, because Google (registered trademark) and Yahoo! (registered trademark) have already developed practical search engines for retrieving images based on keywords and because the Application Program Interface (API) is well known in the art, these aspects of the process will not be described here.

In S104 the CPU 71 calculates one set of mean RGB values ($R_{mean}$, $G_{mean}$, $B_{mean}$) for RGB values (R, G, B) of all pixels constituting each of the images acquired in S102. The mean RGB value set ($R_{mean}$, $G_{mean}$, $B_{mean}$) Includes: a mean R value $R_{mean}$ that is a mean value of R values of all the pixels; a mean G value $G_{mean}$ that is a mean value of G values of all the pixels; and a mean B value $B_{mean}$ that is a mean value of B values of all the pixels. In the example of FIG. 5, the CPU 71 would calculate six mean RGB value sets ($R_{mean1}$, $G_{mean1}$, $B_{mean1}$)-($R_{mean6}$, $G_{mean6}$, $B_{mean6}$) for the images Image 1-Image 6.

In S105 the CPU 71 calculates one set of mean total RGB values ($R_{meantotal}$, $G_{meantotal}$, $B_{meantotal}$) for all the sets of mean RGB values ($R_{mean}$, $G_{mean}$, $B_{mean}$) calculated in S104. The mean total RGB value set ($R_{meantotal}$, $G_{meantotal}$, $B_{meantotal}$) includes: a mean total R value $R_{meantotal}$ that is a mean value of the mean R values $R_{mean}$ of all the images; a mean total G value $G_{meantotal}$ that is a mean value of the mean G values $G_{mean}$ of all the images; and a mean total B value $B_{meantotal}$ that is a mean value of the mean B values $B_{mean}$ of all the images. In the example of FIG. 5, one set of mean total RGB values ($R_{meantotal}$, $G_{meantotal}$, $B_{meantotal}$) is calculated by dividing the sum of mean R values $R_{mean1}$-$R_{mean6}$ in the mean RGB value sets ($R_{mean1}$, $G_{mean1}$, $B_{mean1}$)-($R_{mean6}$, $G_{mean6}$, $B_{mean6}$) by six, by dividing the sum of mean G values $G_{mean1}$-$G_{mean6}$ in the mean RGB value sets ($R_{mean1}$, $G_{mean1}$, $B_{mean1}$)-($R_{mean6}$, $G_{mean6}$, $B_{mean6}$) by six, and by dividing the sum of mean B values $B_{mean1}$-$B_{mean6}$ in the mean RGB value sets ($R_{mean1}$, $G_{mean1}$, $B_{mean1}$)-($R_{mean6}$, $G_{mean6}$, $B_{mean6}$) by six.

In S106 the CPU 71 identifies an image whose mean RGB value set ($R_{mean}$, $G_{mean}$, $B_{mean}$) calculated in S104 has the greatest Euclidean distance from the set of mean total RGB values ($R_{meantotal}$, $G_{meantotal}$, $B_{meantotal}$) calculated in S105, extracts images other than this identified image, and advances to S109. In other words, the CPU 71 discards the image having a mean farthest from the mean total. In the example of FIG. 5, the CPU 71 discards the image having a mean ($R_{mean}$, $G_{mean}$, $B_{mean}$) from among the mean values ($R_{mean1}$, $G_{mean1}$, $B_{mean1}$)-($R_{mean6}$, $G_{mean6}$, $B_{mean6}$) that is farthest from the mean total ($R_{meantotal}$, $G_{meantotal}$, $B_{meantotal}$) and retains the remaining five images. In this way, the CPU 71 discards the image that is least relevant to the keyword.

In the embodiment, the CPU 71 discards only one image, but the present invention is not limited to this method. For example, the CPU 71 may extract only images whose mean has a Euclidean distance from the mean total that falls within a prescribed value. Alternatively, the CPU 71 may extract up to a prescribed number of images in order of those having a Euclidean distance nearest the mean total so that the means of the extracted images will be greater than the means of the discarded images. This method is particularly effective for removing images having low relevance to the keyword when a plurality of such images exists.

However, if the CPU 71 determines in S101 that the keyword inputted in S100 is the same as one of keywords stored in the RAM 73 (a previously inputted keyword), the CPU 71 advances to S103. In S103, the CPU 71 retrieves images related to the keyword via the Internet in the same manner as in S102. Since this process is identical to that of S102, a more detailed description of the process in S103 will not be repeated here. In S107, the CPU 71 calculates a set of mean RGB values ($R_{mean}$, $G_{mean}$, $B_{mean}$) for RGB values (R, G, B) of all the pixels in each of the images acquired in S103 in the same manner as in S104.

In S108 the CPU 71 then reads the set of mean total RGB values ($R_{meantotal}$, $G_{meantotal}$, $B_{meantotal}$) stored in the RAM 73 in association with the keyword inputted in S100. The CPU 71 extracts only images whose mean RGB value sets ($R_{mean}$, $G_{mean}$, $B_{mean}$) from among all the mean RGB value sets ($R_{mean}$, $G_{mean}$, $B_{mean}$) calculated in S107 have Euclidean distances in the RGB color space within a prescribed value from the mean total RGB value set ($R_{meantotal}$, $G_{meantotal}$, $B_{meantotal}$) read from the RAM 73 and advances to S109. If the number of the extracted images exceeds a prescribed upper limit, the CPU 71 extracts only a number of images equal to the upper limit in order of closest distance to the mean total. In this way, the CPU 71 can discard images having low relevance to the keyword.

In S109 the CPU 71 recalculates the set of mean total RGB values ($R_{meantotal}$, $G_{meantotal}$, $B_{meantotal}$) based on the images extracted in S106 or S108. In S110 the CPU 71 sets an image that has a mean RGB value set ($R_{mean}$, $G_{mean}$, $B_{mean}$) from among the mean RGB value sets ($R_{mean}$, $G_{mean}$, $B_{mean}$) calculated in S104 or S107 with the smallest Euclidean distance in the RGB color space from the set of mean total RGB values ($R_{meantotal}$, $G_{meantotal}$, $B_{meantotal}$) recalculated in S109 as the sample image to be used as a model for color conversion, as shown in FIG. 6. Hence, the CPU 71 selects one sample image from among the plurality of images retrieved as images related to the keyword.

In S111 the CPU 71 performs a process to convert the RGB values in each pixel in the sample image set in S110 to HSV parameters, where H is a value from 0 to 360 and S and V are values between 0 and 1. The conversion from RGB to HSV or from HSV to RGB may be performed according to the following conventional equation.

First, the value "V" is calculated by the following formula:

$$V = \max(R \div 255, G \div 255, B \div 255),$$

wherein max(a, b, c) denotes the largest value among a, b, and c.

Based on the determined value "V", the value "S" is calculated by the following formulas:

when V is 0, S=0; and when $V$ is not 0, $S = \{V - \min(R \div 255, G \div 255, B \div 255)\} \div V$, wherein min(a, b, c) denotes the smallest value among a, b, and c.

Based on the value "V", the value "r", "g", and "b" are determined by the following formulas:

when $\{V-\min(R\div255, G\div255, B\div255)\}$ is not 0, $r=(V-R\div255)\div(V-\min(R\div255, G\div255, B\div255)),$ $g=(V-G\div255)\div(V-\min(R\div255, G\div255, B\div255)),$ $b=(V-B\div255)\div(V-\min(R\div255, G\div255, B\div255));$ and when $\{V-\min(R\div255, G\div255, B\div255)\}$ is 0, r=0,
g=0,
b=0.

Based on the values "r", "g", and "b", the value "H" is calculated by the following formulas:

when $V=R\div255, H=60\times(b-g);$ when $V=G\div255, H=60\times(2+r-g);$ and when $V=B\div255, H=60\times(4+g-r).$ It is noted that when H<0, H=H+360

In S112 the CPU 71 performs a first characteristic quantity data determination process for determining a set of first characteristic quantity data representing a characteristic of the sample image based on the HSV parameters determined in the conversion process of S111. The first characteristic quantity data determination process will be described later in greater detail with reference to FIG. 7.

In S113 the CPU 71 loads a user's selected image to be subjected to color conversion (original image) from the memory card into the RAM 73. In the embodiment, the original image will be described as having an RGB format, but the present invention is not particularly limited to this format.

In S114 the CPU 71 performs a process to convert a set of RGB values in each pixel in the original image read in S113 to a set of HSV parameters. In S115 the CPU 71 performs a second characteristic quantity data determination process for determining a set of second characteristic quantity data denoting a characteristic of the original image based on the HSV parameters obtained in the conversion process of S114. The second characteristic quantity data determination process will be described later in greater detail with reference to FIG. 8.

In S116, the CPU 71 performs a representative value resetting process for resetting the values of the first characteristic quantity data of the sample image and the second characteristic quantity data of the original image for those hue-regions that should not be subjected to color conversion (color correction) of S117 to be described later. This representative value resetting process will be described later in greater detail with reference to FIG. 10.

In S117 the CPU 71 corrects the original image based on the first characteristic quantity data determined in S112 and selectively reset in S116 and second characteristic quantity data determined in S115 and selectively reset in S116. Subsequently in S118, the CPU 71 prints the corrected original image by using the image printing section 40.

In S119 the CPU 71 stores the keyword inputted in S100 in the RAM 73 in association with the set of mean total RGB values ($R_{meantotal}$, $G_{meantotal}$, $B_{meantotal}$) calculated in S109, and subsequently ends the current color conversion process. If the keyword is already stored in the RAM 73 in S119, the CPU 71 updates the set of mean total RGB values stored in the RAM 73 to the set of mean total RGB values calculated in S109.

Figure 7:
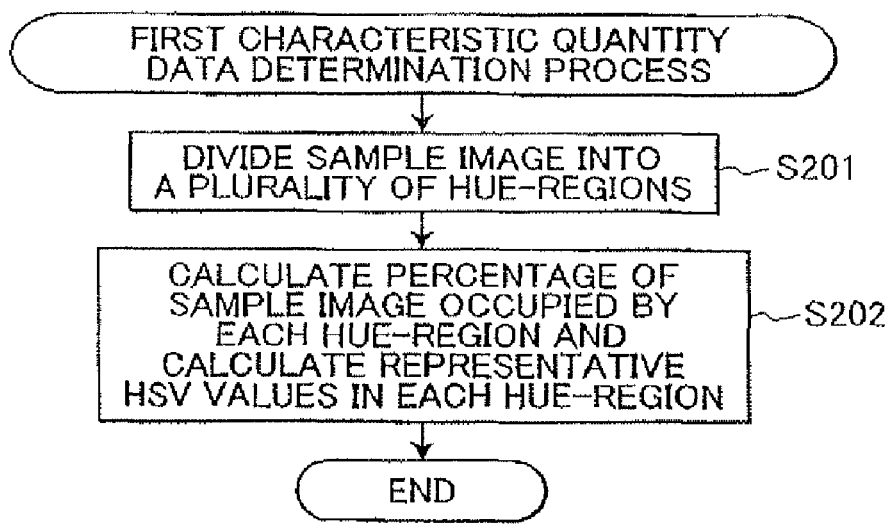
FIG. 7 is a flowchart illustrating steps in a first characteristic quantity data determination process in the color conversion process of FIG. 4.

Next, the first characteristic data determination process of S112 in FIG. 4 for extracting the first characteristic quantity data from the sample image will be described with reference to FIG. 7. FIG. 7 is a flowchart illustrating steps in the first characteristic quantity data determination process. In the following process, it will be assumed that H takes on a value of at least −30 and less than 330. When H does not fall within this range, H is adjusted to a value within the range according to a suitable conversion, such as H=H+360×n or H=H−360×n, where n is an integer.

In S201 of the first characteristic quantity data determination process, the CPU 71 divides the sample image into a plurality of hue-regions (six commonly used hue regions in this example). Specifically, each of the pixels in the sample image is allocated into either one of the following six hue-regions based on its H value:

R hue-region: grater than or equal to −30 and less than 30
Y hue-region: grater than or equal to 30 and less than 90
G hue-region: grater than or equal to 90 and less than 150
C hue-region: grater than or equal to 150 and less than 210
B hue-region: grater than or equal to 210 and less than 270
M hue-region: grater than or equal to 270 and less than 330

Hence, the CPU 71 performs a process to sort all the pixels of the sample image into six classifications based on the above classification criteria for the hue value. The correspondence between each hue-region and the H value given above is merely an example and may be modified as appropriate.

In S202 the CPU 71 calculates representative values (HSV values) for each hue-region in which pixels have been sorted in S201 and the percentage of the sample image that each hue-region occupies.

The representative values (HSV values) for each hue-region are defined as follows.
Representative values for the R hue-region: sHr, sSr, sVr
Representative values for the G hue-region: sHg, sSg, sVg
Representative values for the B hue-region: sHb, sSb, sVb
Representative values for the C hue-region: sHc, sSc, sVc
Representative values for the M hue-region: sHm, sSm, sVm
Representative values for the Y hue-region: sHy, sSy, sVy Here, the representative values in each hue-region are average values of the HSV values of all the pixels allocated in the subject hue-region. The representative values for each hue-region may be median values or middle values of the HSV values of all the pixels in the subject hue-region.

The percentage that each hue-region occupies in the sample image is defined as follows:
Percentage that the R hue-region occupies in the sample image: sRateR
Percentage that the G hue-region occupies in the sample image: sRateG
Percentage that the B hue-region occupies in the sample image: sRateB
Percentage that the C hue-region occupies in the sample image: sRateC
Percentage that the M hue-region occupies in the sample image: sRateM
Percentage that the Y hue-region occupies in the sample image: sRateY The percentage for the R hue-region, for example, may be defined as sRateR=(number of pixels in the R hue-region of the sample image)÷(total number of pixels in the sample image), or may be defined according to another equation.

Figure 8:
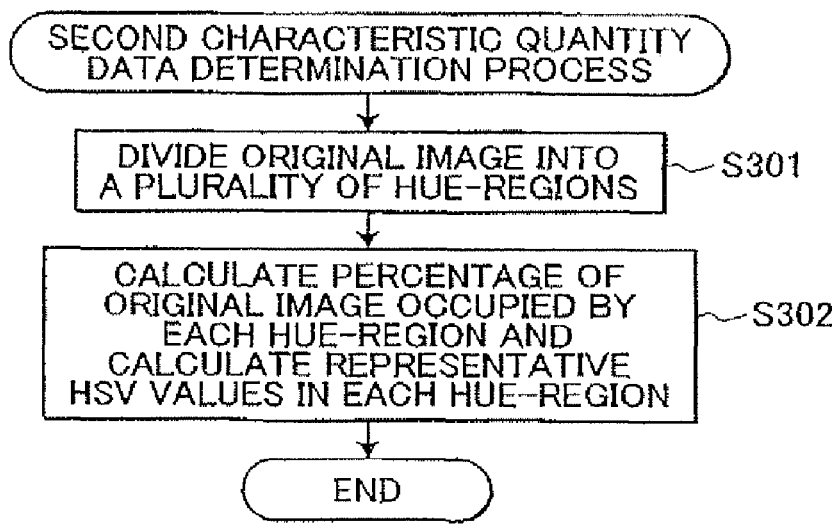
FIG. 8 is a flowchart illustrating steps in a second characteristic quantity data determination process in the color conversion process of FIG. 4.

Next, the second characteristic data determination process of S115 in FIG. 4 for extracting the second characteristic quantity data from the sample image will be described with reference to FIG. 8. In the second characteristic quantity determination process, the same process performed on the sample image in the first characteristic quantity data determination process described above (FIG. 7) is performed on the original image.

In S301 of the second characteristic quantity data determination process, the CPU 71 divides the original image into a plurality of hue-regions (six commonly used hue regions in this example). This process is identical to the process described in S201 of the first characteristic quantity determination process and a description of this process will not be repeated here.

In S302 the CPU 71 calculates the second characteristic quantity data by performing the same process described in S202 of the first characteristic quantity determination process, wherein the representative values for each region (HSV values) are defined as follows.

Representative values for the R hue-region: iHr, iSr, iVr
Representative values for the G hue-region: iHg, iSg, iVg
Representative values for the B hue-region: iHb, iSb, iVb
Representative values for the C hue-region: iHc, iSc, iVc
Representative values for the M hue-region: iHm, iSm, iVm
Representative values for the Y hue-region: iHy, iSy, iVy The Percentage that each region occupies in the original image are defined as follows.

Percentage that the R hue-region occupies in the original image: iRateR
Percentage that the G hue-region occupies in the original image: iRateC
Percentage that the B hue-region occupies in the original image: iRateB
Percentage that the C hue-region occupies in the original image: iRateC
Percentage that the M hue-region occupies in the original image: iRateM
Percentage that the Y hue-region occupies in the original image: iRateY During the representative value resetting process in S116, the CPU 71 determines whether each hue-region should be subjected to the color correction of S117. In other words, the CPU 71 determines whether each hue-region should be a target of conversion of S117. If the CPU 71 determines that the hue-region in question should not be a target of conversion, the CPU 71 resets the representative values both in the first characteristic quantity data and in the second characteristic quantity data for the subject hue-region.

Next, the process performed in S117 of FIG. 4 to convert the original image based on the first and second characteristic quantity data will be described in detail. In this process, the multifunction device 10 converts the H value, S value, and V value of each pixel in the original image.

Figure 9:
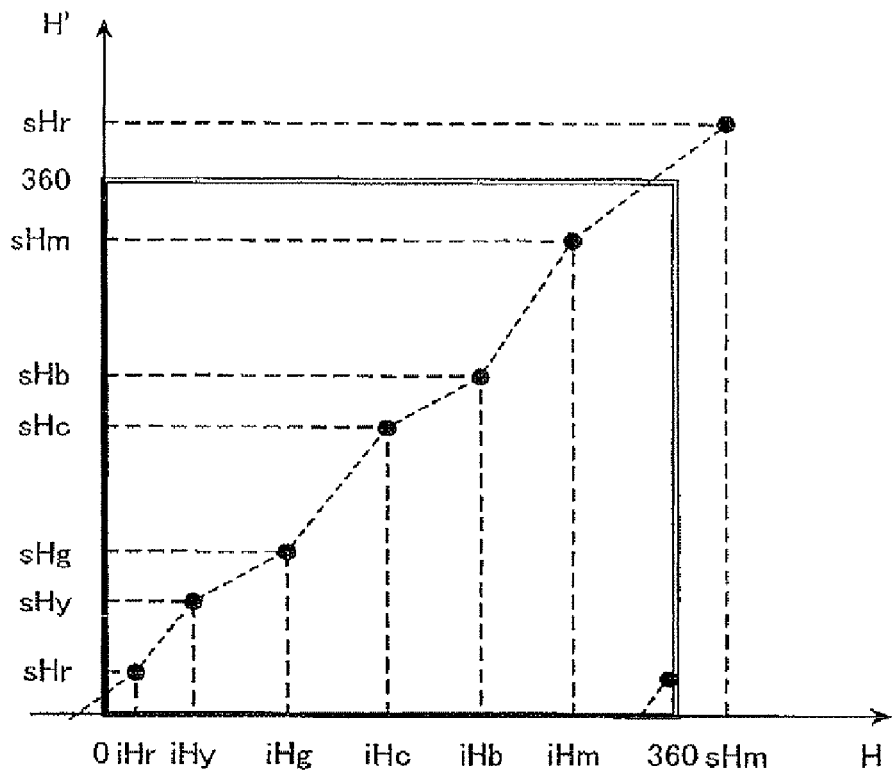
FIG. 9 is a graph for a hue correction table.

First, the conversion process for H values will be described. Representative H values of all the hue regions are plotted in a graph, as shown in FIG. 9, with the X-axis denoting the representative H value of the second characteristic quantity data and the Y-axis denoting the representative H value (denoted by H') of the first characteristic quantity data. Subsequently, a hue conversion table based on the graph in FIG. 9 is created using linear interpolation, for example, between the plotted points. Here, H' is set to H'−360 when H'>360. Similarly, H' is set to H'+360 when H'<0.

The H value of each pixel in the original image is corrected into a corrected H' value by applying the hue conversion table to the H value in each pixel. More specifically, the corrected H' value is calculated according to the following equation:

$$H' = (y2-y1) \div (x2-x1) \times H - (y2-y1) \div (x2-x1) \times x2 + y2 \quad \text{(Equation 1)}$$

Here, H' is set to H'−360 when H'>360. Similarly, H' is set to H'+360 when H'<0.

Here, x1, x2, y1, and y2 are defined as follows.
When H<iHr,
(x1,y1)=(iHm−360,sHm−360), and
(x2,y2)=(iHr,sHr)
When iHr≦H<iHy,
(x1,y1)=(iHr,sHr), and
(x2,y2)=(iHy,sHy).
When iHy≦H<iHg,
(x1,y1)=(iHy,sHy), and
(x2,y2)=(iHg,sHg).
When iHg≦H<iHc,
(x1,y1)=(iHg,sHg), and
(x2,y2)=(iHc,sHc).
When iHc≦H<iHb,
(x1,y1)=(iHc,sHc), and
(x2,y2)=(iHb,sHb).
When iHb≦H<iHm,
(x1,y1)=(iHb,sHb), and
(x2,y2)=(iHm,sHm).
When iHm≦H,
(x1,y1)=(iHm,sHm), and
(x2,y2)=(iHr+360,sHr+360).

The S and V values of each pixel in the original image are converted in a manner that is determined dependent on the hue-region in which the hue value H of the subject pixel is allocated. For example, values "S" and "V" for a pixel, whose H value is allocated in the R hue-region, are converted into corrected values "S" and "V" by the following equations:

When S≦iSr, $$S' = S \times (sSr \div iSr) \quad \text{(Equation 2)}.$$

When S>iSr, $$S' = 1 + (S-1) \times \{(1-sSr) \div (1-iSr)\} \quad \text{(Equation 3)}.$$ When V≦iVr, $$V' = V \times (sVr \div iVr) \quad \text{(Equation 4)}.$$

When V>iVr, $$V' = 1 + (V-1) \times \{(1-sVr) \div (1-iVr)\} \quad \text{(Equation 5)}.$$

S and V values for pixels, whose H values are allocated in other hue-regions, can be similarly calculated. Below, a conversion table defined by the above-described conversion method for S values is referred to as a saturation conversion table, while a conversion table defined by the above-described conversion method for the V value is referred to as a lightness conversion table.

Next, the HSV values of each pixel that has been converted as described above is converted to a format (RGB values, for example) suitable for the image printing section 40. The following method of conversion is merely an example, and it should be apparent that conversion may be performed according to another method.

Below, in, fl, m, and n are parameters used in the process of calculating RGB values from HSV values. Here, in will be the integer portion of (H'÷60) and fl the decimal portion of (H'÷60).

When in is an even number, fl=1−fl.
m=V'×(1−S')
n=V'×(1−S'×fl)
When in is 0,
R=V'×255,
G=n×255, and
B=m×255.

When in is 1,
R=n×255,
G=V'×255, and
B=m×255.
When in is 2,
R=m×255,
G=V'×255, and
B=n×255.
When in is 3,
R=m×255,
G=n×255, and
B=V'×255.
When in is 4,
R=n×255,
G=m×255, and
B=V'×255.
When in is 5,
R=V'×255,
G=m×255, and
B=n×255.

In this way, the color tones of the original image can be converted into the color tones of the sample image for each hue-region in which the hue value H of the subject pixel is allocated by performing color conversion on the original image so that the second characteristic quantity data approaches the first characteristic quantity data.

Figure 10:
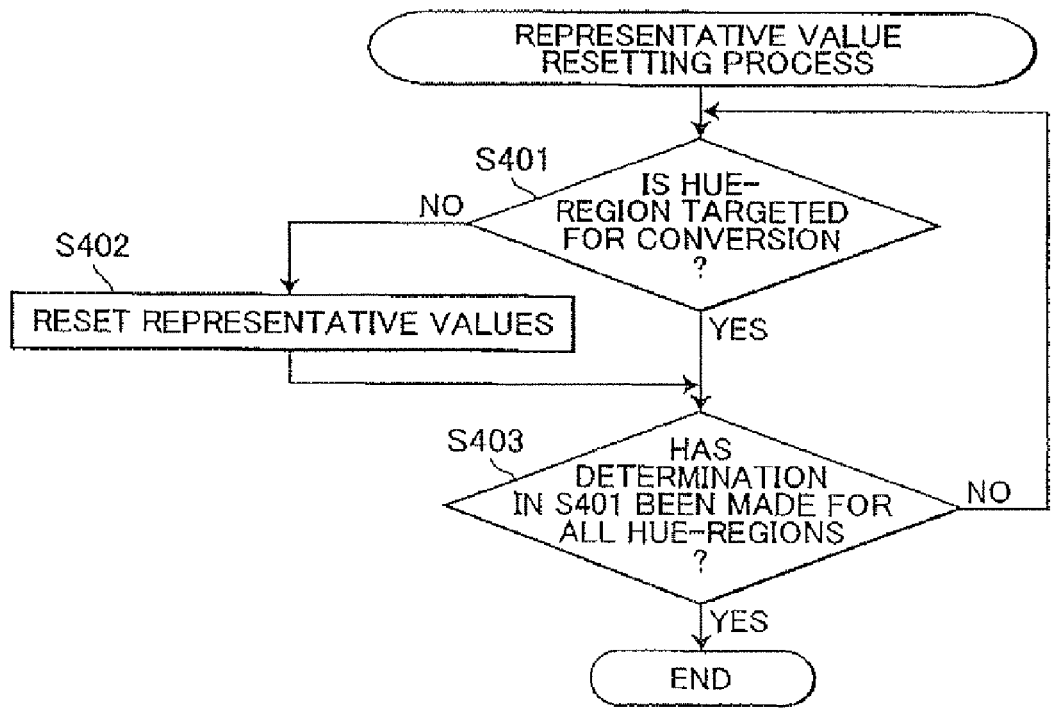
FIG. 10 is a flowchart illustrating steps in a representative value resetting process.

FIG. 10 is a flowchart illustrating steps in the representative value resetting process of S116 in FIG. 4. In S401 of this process, the CPU 71 determines whether one hue-region among the six hue-regions should be a target of conversion. The CPU 71 performs this determination by determining whether the subject hue-region meets a prescribed condition.

The CPU 71 advances to S402 when determining that the hue-region is not a target of conversion (S401: NO) and advances to S403 when determining that the hue-region is a target of conversion (S401: YES). In S402 the CPU 71 resets the representative values for the subject hue-region and subsequently advances to S403.

In S403 the CPU 71 determines whether the process in S401 for determining whether a hue-region is to be converted has been performed for all hue-regions (six hue-regions in the example). If there remain any hue-regions for which the determination of S401 has not yet been performed (S403: NO), the CPU 71 returns to S401. When a determination has been performed on all hue-regions (S403: YES), the CPU 71 ends the representative value resetting process.

Examples of the method of the judgment in S401 includes: (A) a method of using a threshold thre; and (B) a method of using data of a hue-region having the largest area.

(A) Method Using a Threshold Thre

The prescribed condition used in the judgment of S401 described above is a relationship between the size of the hue-region in question and a threshold Thre. When the percentage of the original image or sample image occupied by the subject hue-region is less than the threshold Thre (yes in S401), the CPU 71 changes in S402 the representative values in the first characteristic quantity data of the original image and the representative values in the second characteristic quantity data of the sample image related to this hue-region to the same values, so that conversion will be executed by using the new representative values. The representative values can be changed or reset in the following way:

When sRateR<Thre or iRateR<Thre,
sHr=0, sSr=0.5, sVr=0.5,
iHr=0, iSr=0.5, iVr=0.5.
When sRateG<Thre or iRateG<Thre,
sHg=120, sSg=0.5, sVg=0.5,
iHg=120, iSg=0.5, iVg=0.5.
When sRateB<Thre or iRateB<Thre,
sHb=240, sSb=0.5, sVb=0.5,
iHb=240, iSb=0.5, iVb=0.5.
When sRateC<Thre or iRateC<Thre,
sHc=180, sSc=0.5, sVc=0.5,
iHc=180, iSc=0.5, iVc=0.5.
When sRateM<Thre or iRateM<Thre,
sHm=300, sSm=0.5, sVm=0.5,
iHm=300, iSm=0.5, iVm=0.5.
When sRateY<Thre or iRateY<Thre,
sHy=60, sSy=0.5, sVy=0.5,
iHy=60, iSy=0.5, iVy=0.5.

The above example employs the middle value 0.5 of possible values (0-1) for the S value and V value, and also employs the middle value of the corresponding hue-region for the H value. However, the representative values described above are merely an example, and the present invention is not limited to these values.

When converting a pixel using the equations described above (Equations 2-5), the S and V values of the pixel do not change using the representative values described above. For example, when $S \leq iSr$ for the R hue-region, S' is calculated according to equation 2 as follows.

$$S'=S \times (sSr \div iSr)$$

However, because sSr=0.5 and iSr=0.5 in this equation, the equation becomes:

$$S'=S \times (0.5 \div 0.5)=S \qquad \text{(Equation 6)}$$

Similarly, S'=S when S>iSr.

The V values in this hue-region are not changed, either. The S and V values in other hue-regions are also not changed in the same manner as described above for R hue-region.

Further, by resetting the hue representative values for some hue-region in a manner described above, it is possible to reduce the amount of hue conversion in the hue-region. In other words, the amount of hue conversion can be reduced by modifying the representative values, even when using the conversion equation described above (Equation 1).

Next, a method of determining the threshold Thre will be described. This value Thre can be set based on a sensory evaluation (visual impression). In sensory evaluations, the inventors have confirmed that any hue-region is likely to be perceived when the hue-region occupies more than about 6% of the entire image area. Hence, the threshold Thre can be set to 6%. However, the present invention is not limited to a threshold Thre of 6%.

It is also possible to set the threshold Thre to such a value that can extract hue-regions having a large area relative to other hue-regions. For example, because the image is divided into six hue-regions, the threshold Thre can be set to the inverse value, or ⅙ of the total number of the hue-regions.

The number "six" given as an example of the number of hue-regions is identical to a number that is obtained by subtracting the number of the achromatic colors white and black from the number of vertices (eight that is possessed by an RGB color space, which is one of color gamuts expressing colors) The human eyes can differentiate colors sufficiently when the hues are divided into six hue-regions. If the number of the hue regions is set less than six, there is a possibility that the user may not feel that the original image is modified based on the sample image. Dividing the image into more than six hue-regions will increase the conversion accuracy. However, it is likely that the user will not be able to distinguish the differences in color. Further, the number of calculations increases when the number of divisions increases. When using a printer, such an increase in computations increases the time required to obtain the calibrated image as the printing results, potentially leading to more frustration for the user. Therefore, it is thought that six is a preferable number of divisions.

While the same threshold is used for all hue-regions in the above example, a different threshold Thre may be used for each hue-region.

(B) Method Using Data of a Hue-Region Having the Largest Area

In the above method (A), a threshold Thre is set and representative values are modified based on this threshold Thre, thereby performing control to suspend the image correction process in some hue-regions and to reduce the amount of conversions. Contrarily, the method (B) enables the image correction process to use data of a hue-region having the largest area in the images in order to incorporate only specific colors of the sample image in the original image.

In this method, the prescribed condition in the determination of S401 in FIG. 9 is whether a hue-region having the largest area in the original image is the same as a hue region having the largest area in the sample image, and the hue-region in question is the hue-region having the largest area both in the original image and in the sample image. If the judgment is S401 is affirmative, the representative values for hue-regions other than the subject hue-region are reset according to the following equations, where iMaxRate is the percentage of the original image occupied by the largest-area hue-region in the original image, and sMaxRate is the percentage of the sample image occupied by the largest-area hue-region in the sample image.

When sRateR≠iMaxRate or iRateR≠sMaxRate,
sHr=0, sSr=0.5, sV=0.5,
iHr=0, iSr=0.5, iVr=0.5.
When sRateG≠iMaxRate or iRateG≠sMaxRate,
sHg=120, sSg=0.5, sVg=0.5,
iHg=120, iSg=0.5, iVg=0.5.
When sRateB≠iMaxRate or iRateB≠sMaxRate,
sHb=240, sSb=0.5, sVb=0.5,
iHb=240, iSb=0.5, iVb=0.5.
When sRateC≠iMaxfate or iRateC≠sMaxRate,
sHc=180, sSc=0.5, sVc=0.5,
iHc=180, iSc=0.5, iVc=0.5.
When sRateM≠iMaxRate or iRateM≠sMaxRate,
sHm=300, sSm=0.5, sVm=0.5,
iHm=300, iSm=0.5, iVm=0.5.
When sRateY≠iMaxRate or iRateY≠sMaxRate,
sHy=60, sSy=0.5, sVy=0.5,
iHy=60, iSy=0.5, iVy=0.5.

Through this process, only those pixels that are located in the hue-region that has the largest area both in the original image and in the sample image are converted. Accordingly, in the hue-regions other than the largest-area hue-region, S and V values are not converted, and the amount of conversions for H values is reduced.

Figure 11:
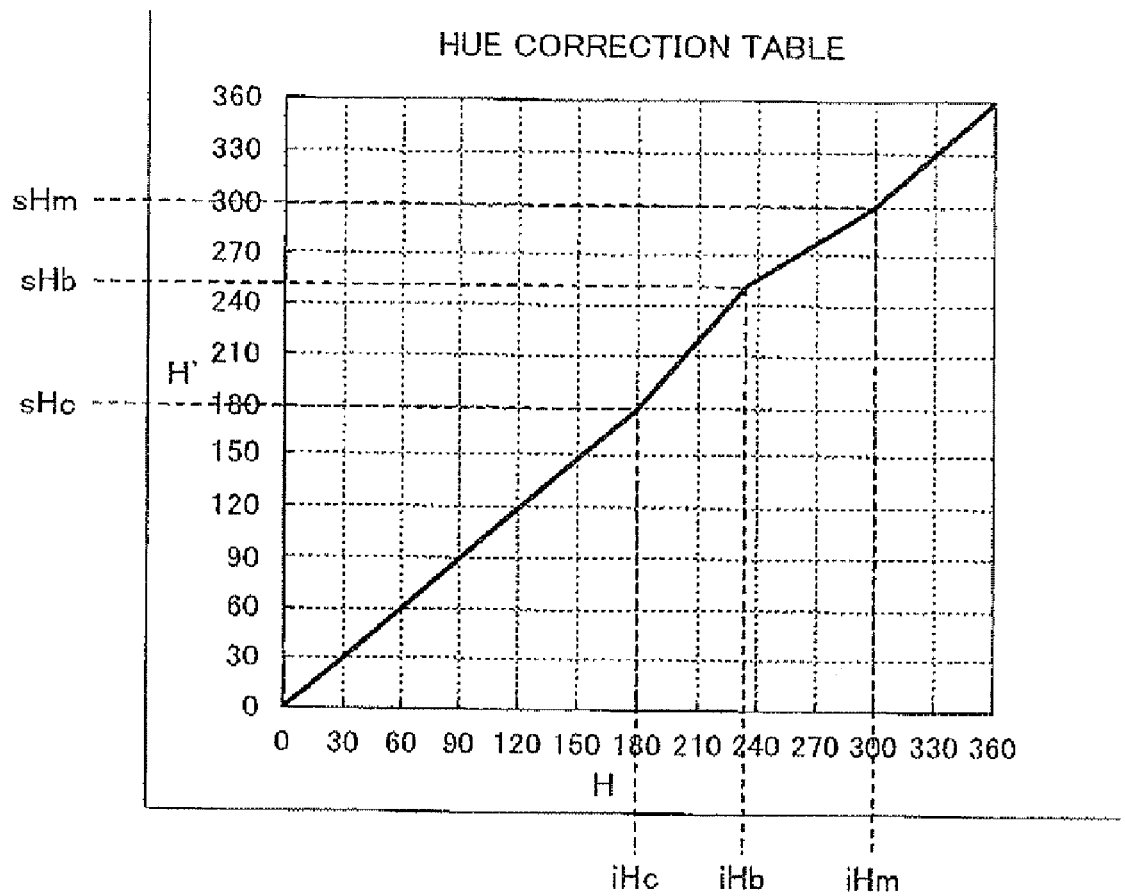
FIG. 11 is a graph for a hue correction table created when only the B hue-region is converted.

For example, when the B hue-region occupies the largest area both in the original image and the sample image, the hue correction table of FIG. 9 is modified into a hue correction table, such as shown in the graph of FIG. 11. As shown in the graph of FIG. 11, the representative H values (iHc=180, sHc=180) in the C hue-region adjacent to the B hue-region in the color space and the representative H values (iHb, sHb) in the B hue-region are connected with each other by a straight line, and the representative H values (iHm=300, sHm=300) in the M hue-region adjacent to the B hue-region in the color space and the representative H values (iHb, sHb) in the B hue-region are connected with each other by another straight line.

Therefore, H values are converted in both the C hue-region, where 180<H≦210, and the M hue-region, where 270<H≦300. The amount of conversion increases as the H value becomes closer to the B hue-region. In the image correction process according to the embodiment described above, it is possible to select hue-regions where conversion is executed. Further, because a portion of the H values in hue-regions not targeted for conversion but adjacent to hue-regions targeted for conversion in the color space are converted, this method can prevent the occurrence of false contour (tone jump) between converted and non-converted hue-regions.

By performing this representative value resetting process, the multifunction device 10 can partially suspend the correction process for divided hue-regions based on the size of the hue-regions and can reduce the amount of conversions. Accordingly, the user is able to reflect only part of the color tones from the sample image in the color tones of the original image.

1-4. Effects of the Embodiment

As described above, the multifunction device 10 according to the embodiment acquires a keyword inputted by the user (S100), acquires images related to the inputted keyword via the Internet (S102), and determines first characteristic quantity data expressing characteristics of a sample image (S111, S112). The multifunction device 10 also inputs an original image targeted for color conversion from a memory card (S113) and determines second characteristic quantity data representing the characteristics of the inputted original image (S114, S115). The multifunction device 10 then performs color conversion on the original image so that the characteristic of the original image represented by the second characteristic quantity data approaches the characteristic of the sample image represented by the first characteristic quantity data (S116, S117).

With the multifunction device 10 having this construction, the user can perform intuitive color conversion on an original image through simple operations involving only specifying a keyword for identifying an image to be used as a model for color conversion. Further, the multifunction device 10 of the embodiment can perform color conversion using a sample image without actually possessing the sample image.

For example, if the original image includes a building and sky and the user wishes to convert the blue color of the sky to a brilliant ocean blue, the user can input a keyword for identifying images having a brilliant ocean blue, and the multifunction device 10 can convert the blue color in the original image to the ocean blue color in an image based on this keyword.

Similarly, the multifunction device 10 can convert flesh tones in an original image showing a person's profile to lighter tones when the user specifies a keyword for identifying an image showing lighter flesh tones.

With this configuration, the multifunction device 10 can perform desired color conversion process involving only specifying a keyword for identifying an image to be used as a model for color conversion without specialized skills. Further, because the multifunction device 10 selects a region subject to color conversion automatically, the multifunction device 10 can halt or reduce color conversion process for the region unlikely to be perceived and perform color conversion process for the region likely to be perceived.

The multifunction device 10 acquires an image relevant to the keyword and determines first characteristic quantity data based on the acquired image, rather than using first characteristic quantity data that has been preset for each keyword. This allows more flexible settings using arbitrary keywords.

When a plurality of images related to a keyword is acquired, the multifunction device 10 selects one of the images and identifies the first characteristic quantity data expressing the characteristics of the selected image. Specifically, the multifunction device 10 calculates a mean of pixel values for each of the plurality of acquired images (S104-S107) and selects the image with a mean closest to the mean total, which is an average of the plurality of calculated mean values (S110). In this way, the multifunction device 10 can perform color conversion on the original image based on the most average image among the plurality of images (in other words, the image likely to be most relevant to the keyword).

The multifunction device 10 also recalculates the mean total based on only the acquired images having a mean that satisfies the condition of not being farthest in distance from the mean total (S106, S109) and selects the image having the mean nearest the recalculated mean total (S110).

In addition, the multifunction device 10 stores the calculated mean total in association with the keyword (S119). If a stored keyword is subsequently inputted (S101: YES), the multifunction device 10 recalculates the mean total based only on acquired images having a mean that meets the condition in which the distance to the mean total stored in association with the keyword is within a prescribed value (S107-S109) and selects the image having the mean nearest the recalculated mean total (S110).

By discarding images having low relevance to the keyword, the multifunction device 10 can improve the reliability of the total mean and can select an image appropriately reflecting the keyword.

2. Second Embodiment

Next, the multifunction device 10 according to a second embodiment of the present invention will be described. The second embodiment differs from the first embodiment in that the multifunction device 10 performs the color conversion process illustrated by the flowchart in FIG. 12 in place of the color conversion process of FIG. 4 described above. The remaining structure and operations of the multifunction device 10 are identical to those described in the first embodiment and will not be described below.

Figure 12:
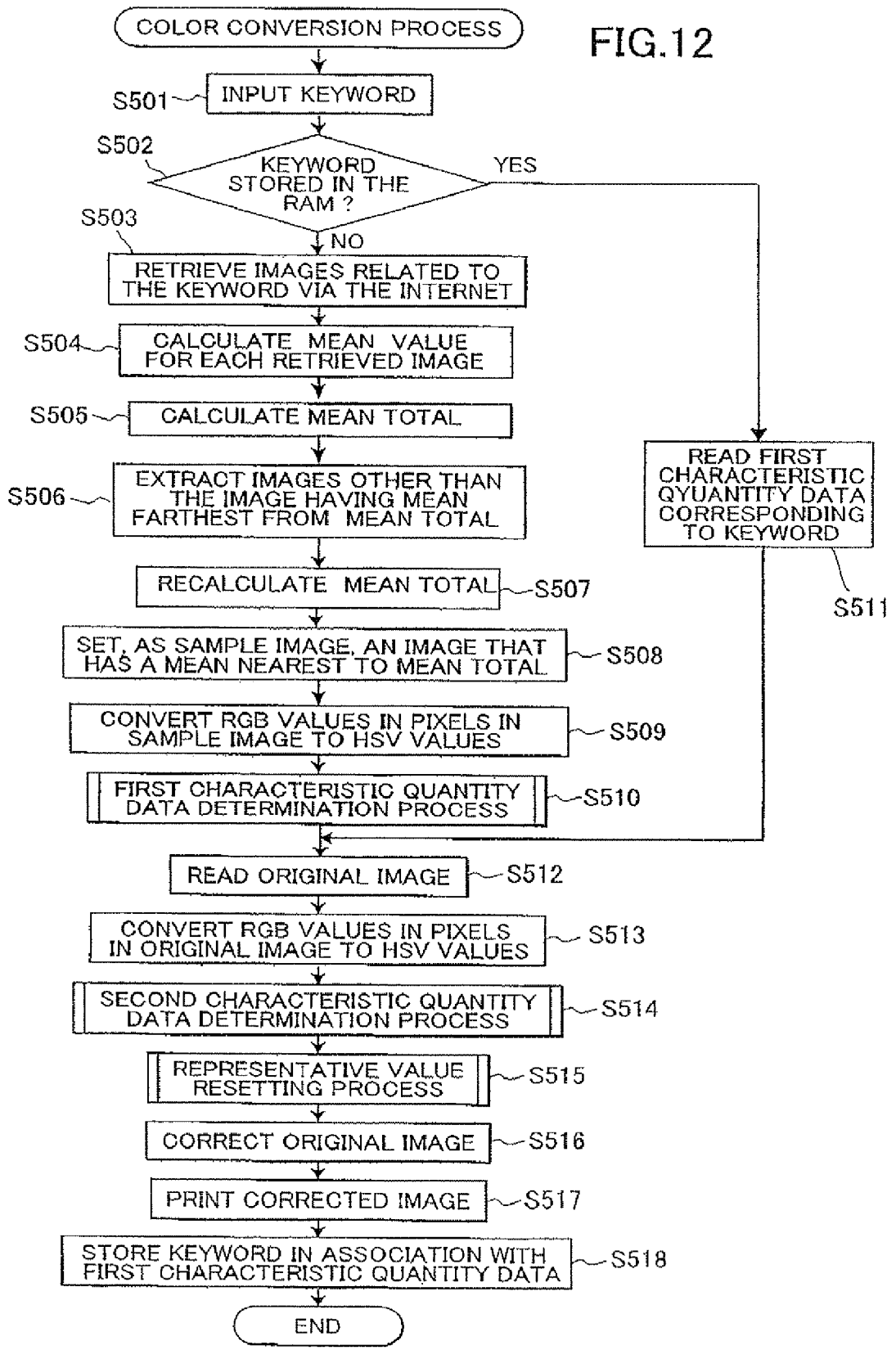
FIG. 12 is a flowchart illustrating steps in the color conversion process according to a second embodiment.

In the color conversion process of FIG. 12, steps S501-S510 and S512-S517 are identical to steps S100-S102, S104-S106 and S109-S118 of the color conversion process in FIG. 4. However, the color conversion process in FIG. 12 differs in the process performed when the CPU 71 of the multifunction device 10 determines in S502 that the keyword is stored in the RAM 73 (S511) and in S518. Therefore, the following description will focus on these different points rather than the common points.

When the CPU 71 determines in S502 that the keyword inputted in S501 is stored in the RAM 73 (a previously inputted keyword), the CPU 71 advances to S511 and reads the first characteristic quantity data stored in the RAM 73 in association with this keyword. Then the CPU 71 advances to S512.

Further, in S518 the CPU 71 stores the keyword inputted in S501 in the RAM 73 in association with the first characteristic quantity data calculated in S510, and subsequently ends the current color conversion process. If the same keyword is already stored in the RAM 73, the stored contents are left unchanged.

Accordingly, when a new keyword is inputted in the color conversion process according to the second embodiment, the multifunction device 10 stores this keyword in association with the first characteristic quantity data. When a keyword that has been inputted previously (not new) is inputted again, the multifunction device 10 uses the first characteristic quantity data stored in association with the keyword.

Hence, when a previously inputted keyword is inputted again, the multifunction device 10 having this configuration can perform color conversion without acquiring the images relevant to the keyword.

Moreover, the multifunction device 10 having this configuration can fix color conversion settings for keywords. In other words, while color conversion settings may vary with the multifunction device 10 according to the first embodiment because different images could be acquired depending on the point in time that the color conversion process is executed and the like, the multifunction device 10 according to the second embodiment fixes color conversion settings for the keywords.

While the invention has been described in detail with reference to the embodiments thereof, it would be apparent to those skilled in the art that various changes and modifications may be made therein without departing from the spirit of the invention.

(1) The embodiments described above give an example of the multifunction device 10 acquiring sample images via the Internet, but the present invention is not limited to this configuration. For example, the multifunction device 10 may acquire sample images from an external device connected to a LAN or from an internal storage device of the multifunction device 10 itself. However, when acquiring images from the Web, as described in the embodiments, the multifunction device 10 can access an enormous number of images via the Internet, reducing the possibility of finding no images relevant to the inputted keyword. Further, the image processor of the present invention is not limited to the multifunction device 10 described above, but may be a personal computer or other data processor.

(2) In the embodiments described above, when a plurality of images related to the keyword is acquired, the multifunction device 10 determines the first characteristic quantity data based on a single image selected from the plurality of images, but the present invention is not limited to this configuration. For example, the multifunction device 10 may determine characteristic quantity data representing the overall characteristics of the plurality of images as the first characteristic quantity data. However, selecting a single image from among the plurality of acquired images as described in the embodiments is effective in that the multifunction device 10 does not reflect characteristics of images with low relevancy to the keyword in the first characteristic quantity data.

(3) While a plurality of images relevant to the keyword is acquired in the example of the embodiments, the multifunction device 10 may acquire only a single sample image instead. When only a single sample image is acquired, the acquired image is set as a sample image. The process of S104-S106, S107-S108 and S109 may be omitted from the process of FIG. 4. In S110, the acquired image is set as the sample image. The process of S504-S508 may be omitted from the process of FIG. 12. In S508, the acquired image is set as the sample image.

(4) In the embodiments described above, images to undergo color conversion are inputted from a memory card, but the present invention is not limited to this configuration. For example, images scanned by the image-reading unit 20 or images received from an external source via the communication section 60 may be subjected to color conversion.

(5) In the color conversion process of the embodiments described above, a process is performed to convert pixels in the sample image and original image to HSV parameters prior to the process for identifying the first and second characteristic quantities, but the present invention is not limited to this process. For example, pixels may be converted to other parameters than HSV parameters, such as L*c*h* parameters or RGB parameters.

(6) In the embodiments described above, the second characteristic quantity data is identified after identifying the first characteristic quantity data in the color conversion process, but the first characteristic quantity data may be identified after identifying the second characteristic quantity data.

(7) In the embodiments described above, the algorithm for identifying the first characteristic quantity data is identical to the algorithm for identifying the second characteristic quantity data, but different algorithms may be used.

(8) In the embodiments described above, the representative value resetting process is performed to suspend part of the correction process based on the size of color regions and to reduce the amount of conversions. However, it is not necessary to perform the representative value resetting process.

(9) In the embodiment described above, a color conversion process is used as an example of the image correction process, but an image correction process other than that described in the embodiment may be performed.

(10) While the amount of conversion for H values in the hue-regions not targeted for conversion can be reduced in the image correction process of the embodiment, the conversion may not be completely eliminated. This is because the H values in hue-regions not targeted for conversion are affected by the representative values in hue-regions targeted for conversion, since linear interpolation is performed using representative values of hue-regions not targeted for conversion, as illustrated in FIG. 11.

Figure 13:
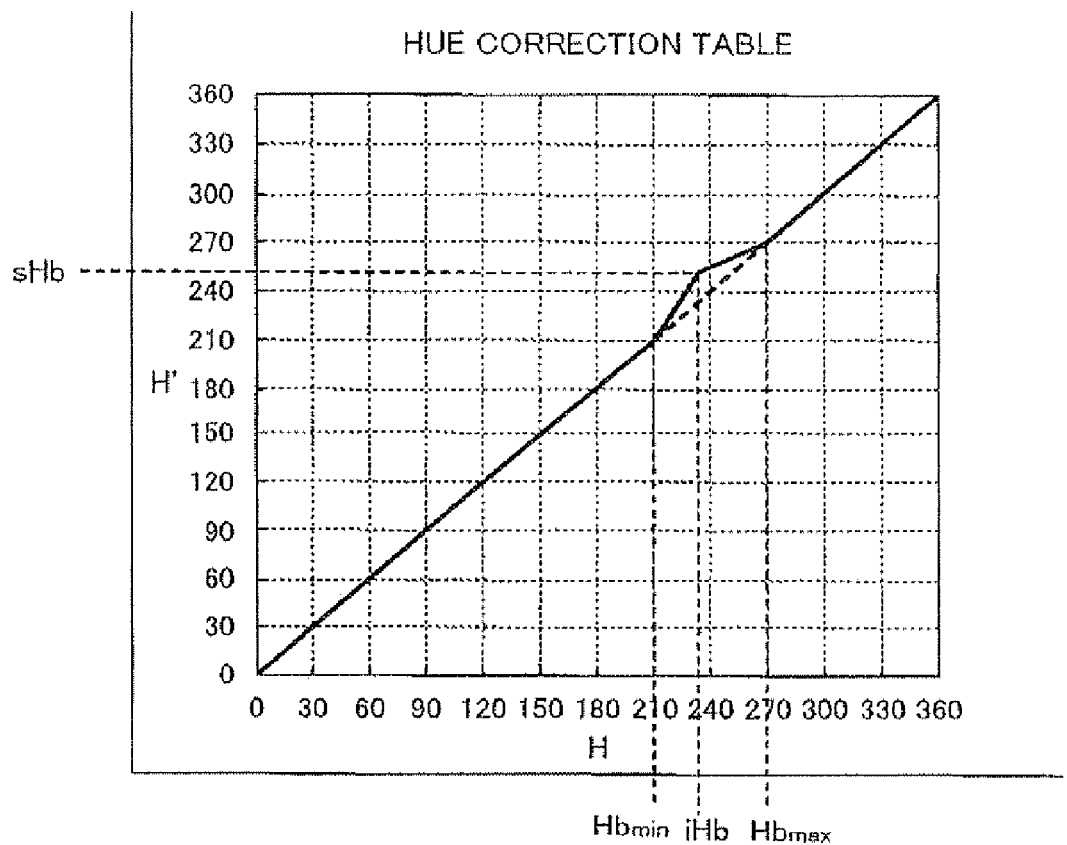
FIG. 13 is a graph for a hue correction table according to a variation of the embodiments.

According to this modification, the hue correction table of FIG. 11 is further modified as shown in the graph in FIG. 13. FIG. 13 shows the hue correction table targeting only the B hue-region for conversion. While only one hue-region is targeted for conversion in FIG. 13, it is also possible to target a plurality of hue-regions.

In FIG. 13, H'=H for values outside the B hue-region, and thus image correction is not performed in these hue-regions. The value of H' in the B hue-region can be found with the following equation, where $Hb_{min}$ is the smallest value of H (210) in the B hue-region and $Hb_{max}$ is the largest value in the B hue-region (270).

When H<iHb, $H'=Hb\min+(sHb-Hb\min)\times(H-Hb\min)\div(iHb-Hb\min)$.

When H>iHb, $H'=sHb+(Hb\max-sHb)\times(H-iHb)\div(Hb\max-iHb)$.

Hence, the above equations can be used to convert pixels in only the targeted hue-region. By converting H values only in the hue-region targeted for conversion, the effects of image correction can be enhanced.

Figure 14:
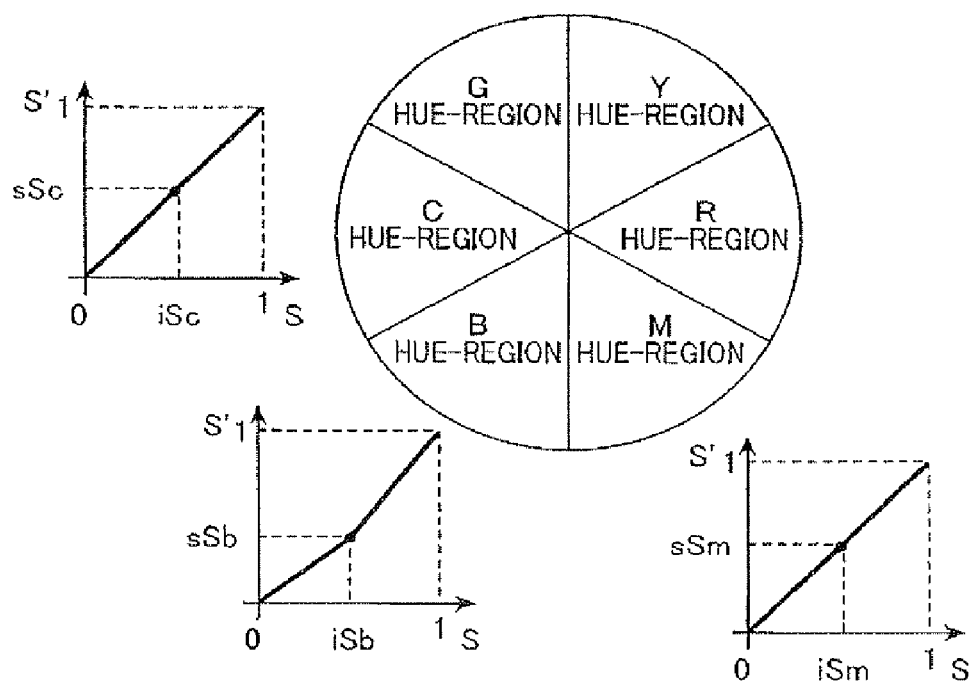
FIG. 14 shows graphs illustrating saturation correction tables for three color hue-regions.

(11) As described above, the S value correction curves for the respective hue-regions (conversion equation 2 or 3) are independent from one another. So, there is a danger of generating false contour (tone jump). More specifically, a table indicating the relationship between S and S' is provided for each hue-region, as shown in FIG. 14, without consideration for the properties of tables for adjacent hue-regions. Similarly, the V value correction curves (conversion equation 4 or 5) for the respective hue-regions are also independent from one another.

Figure 15:
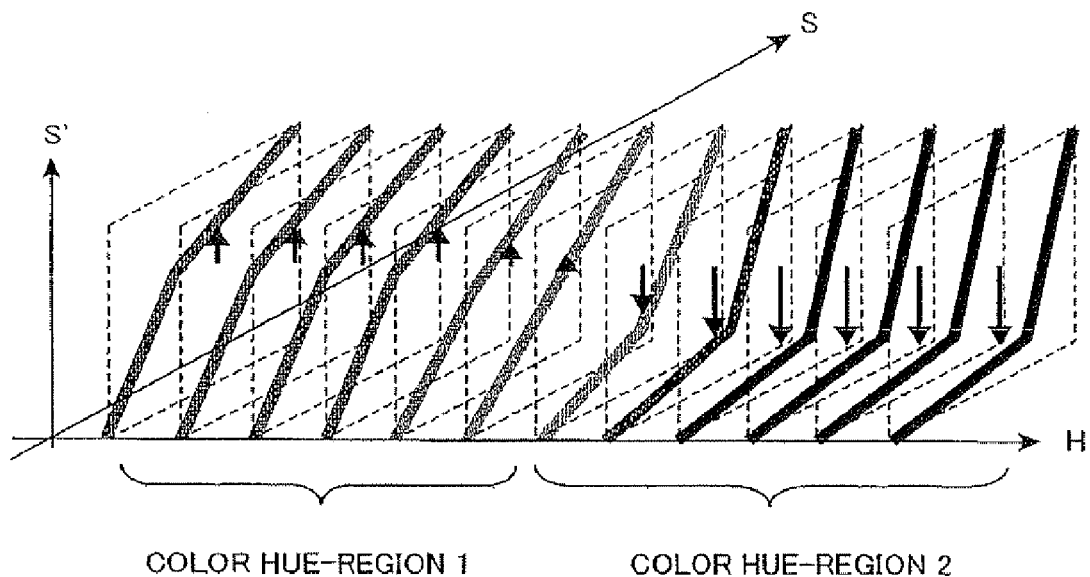
FIG. 15 is an explanatory diagram illustrating changes in saturation correction curves.

In this modification, tone jump can be prevented by modifying the correction curves in the respective hue-regions so that the correction curves will smoothly change through the hue-regions as shown in FIG. 15.

According to the modification, the image correction process for correcting the V value and the S value of a pixel is executed in S117 and S516 while modifying the correction curves. This image correction process will be described next in detail with reference to FIGS. 16 and 17. Following explanation is for the case where the hue value of a pixel targeted for conversion falls in the B hue-region and is nearer to the C hue-region than to the M hue-region. However, the process is essentially the same for other cases.

The value S of the pixel targeted for conversion is converted into a modified, converted value S" according to equation 7 below using the following parameters.

Figure 16:
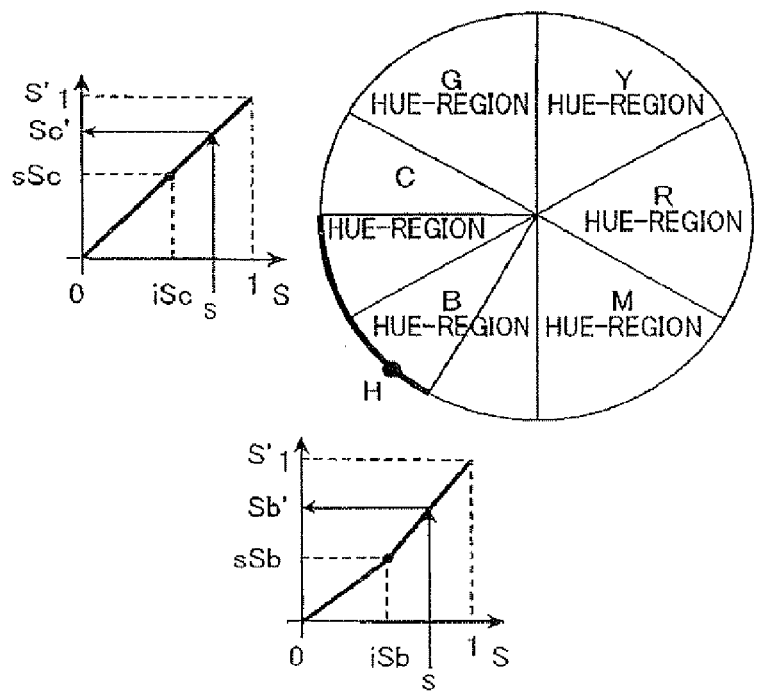
FIG. 16 shows graphs of saturation correction tables for the B and C hue-regions.

H: The hue value for the pixel (see FIGS. 16 and 17)
S: The saturation value for the pixel (see FIG. 16)
$Hb_{mid}$: The middle hue value (240) in a target hue-region (B hue-region in this example), where the hue value H of the pixel falls
$Hc_{mid}$: The middle hue value (180) in another hue-region (C hue-region, in this example) that is adjacent to the target hue-region on a side near the hue coordinate position of the hue value H of the pixel (see FIGS. 16 and 17)
Sb': A B-region-dependent converted saturation value for the pixel, which is calculated by using the above-described equation 2 or 3 (the saturation correction table) for the B hue-region based on the saturation value S of the pixel as shown in FIG. 16 (see FIG. 16) Sc': A C-region-dependent converted saturation value for the pixel, which is calculated by using the above-described equation 2 or 3 (the saturation correction table) for the C hue-region based on the saturation value S of the pixel as shown in FIG. 16 (see FIG. 16)

$$S''=\{(H-Hc_{mid})\times Sb'+(Hb_{mid}-H)\times Sc'\}\div\{(Hb_{mid}-Hc_{mid})\} \quad \text{(Equation 7)}$$

The value V of the pixel targeted for conversion is converted into a modified, converted value V" according to equation 8 below using the following parameters.

H: The hue value for the pixel (see FIGS. 16 and 17) V: The brightness value for the pixel
$Hb_{mid}$: The middle hue value (240) in a target hue-region (B hue-region in this example), where the hue value H of the pixel falls
$Hc_{mid}$: The middle hue value (180) in another hue-region (C hue-region, in this example) that is adjacent to the target hue-region on a side near the hue coordinate position of the hue value H of the pixel (see FIGS. 16 and 17)
Vb': A B-region-dependent converted brightness value for the pixel, which is calculated by using the above-described equation 4 or 5 (the brightness correction table) for the B hue-region based on the brightness value V of the pixel
Vc': A C-region-dependent converted brightness value for the pixel, which is calculated by using the above-described equation 4 or 5 (the brightness correction table) for the C hue-region based on the brightness value V of the pixel $$V''=\{(H-HC_{mid})\times Vb'+(Hb_{mid}-H)\times Vc'\}\div\{(Hb_{mid}-HC_{mid})\} \quad \text{(Equation 8)}$$

The above process is performed when the hue value H of the pixel in question is in the range of $Hc_{mid}$ (180) to $Hb_{mid}$ (240) as shown in FIGS. 16 and 17. By finding the output saturation value (S") and lightness value (V") through the above calculations weighted according to the input hue value H, it is possible to produce smooth correction effects between hues.

What is claimed is:

1. An image processor comprising:
    a keyword inputting unit that inputs a keyword;
    a first image acquiring unit that acquires a plurality of first images related to the keyword inputted by the keyword inputting unit;
    a calculating unit that calculates a mean value of pixel values of pixels in each of the plurality of first images acquired by the first image acquiring unit, thereby determining a plurality of mean values for the plurality of first images;
    a selection unit that selects one first image from the plurality of first images based upon a color attribute of pixels in each of the plurality of first images, the selecting unit selects one of the first images whose mean value is closest to a mean value of the plurality of mean values;
    a first characteristic quantity determining unit that determines first characteristic quantity data expressing a characteristic of the selected one first image;
    a second image inputting unit that inputs a second image;
    a second characteristic quantity determining unit that determines second characteristic quantity data expressing a characteristic of the second image inputted by the second image inputting unit; and
    an image correcting unit that performs an image correction process on the second image to adjust characteristic of the second image represented by the second characteristic quantity data close to the first characteristic quantity data.

2. An image processor according to claim 1, wherein the calculating unit calculates a mean total value by calculating a mean value of the plurality of mean values of the plurality of first images acquired by the first image acquiring unit, and extracts a sub-set of the first images whose mean values satisfy a prescribed condition relative to the calculated mean total value, and recalculates the mean total value by calculating a mean value of the mean values of the extracted sub-set of the first images, and wherein the selecting unit selects, from among the plurality of first images acquired by the first image acquiring unit, one first image whose mean value is closest to the recalculated mean total.

3. An image processor according to claim 2, further comprising a mean total value storing unit that stores, in association with the inputted keyword, the mean total value recalculated by the calculating unit;
    wherein when a keyword newly inputted by the keyword inputting unit is the same as the keyword stored in the mean total value storing unit, the first image acquiring unit newly acquires a plurality of first images related to the newly inputted keyword, and
    wherein when the first image acquiring unit newly acquires the plurality of first images related to the newly inputted keyword, the calculating unit newly calculates a mean value of pixel values of pixels in each of the newly acquired first images, the calculating unit newly extracts a sub-set of the newly acquired first images whose mean values satisfy a prescribed condition relative to the mean total value stored in association with the keyword, and newly recalculates the mean total value by calculating a mean value of the mean values of the newly extracted sub-set of the newly acquired first images and the selecting unit newly selects, from among the newly acquired first images, one first image whose mean value is closest to the newly recalculated mean total value.

4. An image processor according to claim 1, further comprising a characteristic quantity storing unit that stores first characteristic quantity data determined by the first characteristic quantity data determining unit in association with the keyword;
    wherein, when a keyword newly inputted with the keyword inputting unit is the same as the keyword stored in the characteristic quantity storing unit, the first characteristic quantity determining unit reads the first characteristic quantity data stored in association with the keyword.

5. An image processor according to claim 1, wherein the first image acquiring unit acquires the plurality of first images from a storage device through communications via the Internet.

6. An image processor according to claim 1, wherein the first characteristic quantity determining unit determines a plurality of values as the first characteristic quantity data according to a prescribed condition;
    the second characteristic quantity determining unit determines a plurality of values as second characteristic quantity data according to the same condition as that used by the first characteristic quantity determining unit; and
    the image correcting unit performs an image correction process on each pixel constituting the second image based on a correction value that is determined for the subject pixel based on the plurality of values determined as the first characteristic quantity data and the plurality of values determined as the second characteristic quantity data.

7. An image processing method, comprising:
    inputting a keyword;
    acquiring a plurality of first images related to the inputted keyword;
    calculating a mean value of pixel values of pixels in each of the acquired plurality of first images, thereby determining a plurality of mean values for the plurality of first images,
    selecting one first image from the plurality of first images based upon a color attribute of pixels in each of the plurality of first images, the selecting including selecting the one first image whose mean value is closet to a mean value of the plurality of mean values;
    determining first characteristic quantity data expressing a characteristic of the selected one first image;
    inputting a second image;
    determining second characteristic quantity data expressing a characteristic of the inputted second image; and
    performing an image correction process on the second image to adjust characteristic of the second image represented by the second characteristic quantity data close to the first characteristic quantity data.

8. A computer readable storage medium storing a set of image processing program instructions, the instructions comprising:
    inputting a keyword;
    acquiring a plurality of first images related to the inputted keyword;
    calculating a mean value of pixel values of pixels in each of the acquired plurality of first images, thereby determining a plurality of mean values for the plurality of first images,
    selecting one first image from the plurality of first images based upon a color attribute of pixels in each of the plurality of first images, the selecting including selecting the one first image whose mean value is closest to a mean value of the plurality of the mean value;
    determining first characteristic quantity data expressing a characteristic of the selected one first;
    inputting a second image;
    determining second characteristic quantity data expressing a characteristic of the inputted second image; and
    performing an image correction process on the second image to adjust characteristic of the second image represented by the second characteristic quantity data close to the first characteristic quantity data.

* * * * *